United States Patent [19]

Suzuki

[11] Patent Number: 5,563,479
[45] Date of Patent: Oct. 8, 1996

[54] POWER SUPPLY APPARATUS FOR ELECTRIC VEHICLE

[75] Inventor: Shigemitsu Suzuki, Aichi pref., Japan

[73] Assignee: Aisin Seiki Kabushiki Kaisha, Aichi Pref., Japan

[21] Appl. No.: 331,738

[22] Filed: Oct. 31, 1994

[30] Foreign Application Priority Data

| Oct. 29, 1993 | [JP] | Japan | 5-271917 |
| Nov. 12, 1993 | [JP] | Japan | 5-283486 |
| Dec. 24, 1993 | [JP] | Japan | 5-327154 |
| Feb. 18, 1994 | [JP] | Japan | 6-044889 |

[51] Int. Cl.$^6$ .................................... H02P 1/00
[52] U.S. Cl. ........................... 318/139; 388/811
[58] Field of Search ............... 318/139; 388/809–815, 388/906

[56] References Cited

U.S. PATENT DOCUMENTS

| 3,699,419 | 10/1972 | Jinzenji et al. | 318/376 X |
| 4,025,836 | 5/1977 | Naito et al. | 318/139 X |
| 4,025,860 | 5/1977 | Shibata et al. | 318/139 |
| 4,124,812 | 11/1978 | Naito et al. | 318/371 |
| 4,211,965 | 7/1980 | Toyama et al. | 318/139 X |
| 4,258,304 | 3/1981 | Bourke | 318/139 X |
| 4,288,728 | 7/1981 | Niimi et al. | 318/139 X |
| 4,673,851 | 6/1987 | Disser | 318/599 X |

FOREIGN PATENT DOCUMENTS

| 4340301 | 11/1992 | Japan . |
| 530608 | 2/1993 | Japan . |

*Primary Examiner*—David S. Martin
*Attorney, Agent, or Firm*—Sughrue, Mion, Zinn, Macpeak & Seas

[57] ABSTRACT

A power supply apparatus for an electric vehicle, which is adapted to restrain battery discharge due to current pulsations of a load. The apparatus has a battery, a coil and a capacitor connected to the battery via the coil to supply power. The apparatus controls the burden ratio of discharge current between the battery and the capacitor in accordance with various operation modes of the electric vehicle to extend a travelable distance thereof.

14 Claims, 19 Drawing Sheets

POWER SUPPLY APPARATUS FOR ELECTRIC VEHICLE

BACKGROUND OF THE INVENTION

1. Field of the Invention

The present invention relates to an apparatus for controlling a load applied to a motor as a power supply of an electric vehicle.

2. Description of Related Art

Recently, environmental pollution has become a serious problem to be solved, and effective measures for purifying emission gases from gasoline or diesel-powered vehicles have been required. Under these circumstances, electric vehicles which are free from emission gases have been lately put to practical use for specific purposes. However, electric vehicles are still considerably inferior to the gasoline or diesel-powered vehicles in continuously travelable distance and acceleration performance. In order to ensure running ability identical to that of gasoline or diesel-powered vehicles, electric vehicles are required to obtain the travelable distance on one battery charge identical or near that of the gasoline or diesel-powered vehicles on one oil supply. And to answer the above demand, various researches have been made.

An electric vehicle disclosed in Japanese patent application laid-open No. Hei 4-340301 includes a chopper between a motor and a battery, and capacitors on inlet and outlet sides of the chopper. With this arrangement, kinetic and potential energy due to braking is converted to electric energy, and is sent back to the battery.

FIG. 11 illustrates a circuit diagram of a power supply device for the electric vehicle disclosed in the above publication. As shown, between a DC motor M and a battery Ba, a chopper composed of a reactor L, a switching element Q2 which is turned on and off by a control mechanism, and a diode D2 which supplies an electromotive force of the motor M to the battery Ba when the element Q2 is turned off from on. Capacitors C1 and C2 are respectively connected to both sides of the chopper for blocking high frequency wave. When the motor M is decelerated, an electric current due to the electromotive force of the motor M flows through the reactor L and the element which is in on state. When the element Q2 is in the off state, the above electric current flows to the diode D2, and is sent back to the battery Ba and collected thereby at a high efficiency by virtue of the reactor L.

A hybrid power supply apparatus for an electric vehicle disclosed in Japanese Patent application laid-open No. Hei 5-30608 is schematically illustrated in FIG. 12. As shown, the hybrid power supply apparatus includes an electric current control circuit 210 which controls the amount of current flow in response to the deceleration amount. The circuit 210 is connected between a capacitor 110, a battery 120 and a convertor 140. The apparatus further includes a collecting and charging circuit composed of a switch SW2 which is connected to the battery 120 and a current control circuit 130, and a discharging circuit composed of a switch SW1 and a diode D. With this arrangement, the burden imposed on the battery 120 upon discharge and collection of the energy due to acceleration and deceleration of electric vehicles is shared with the capacitor 110, and accordingly, the rapid charge of the battery due to deceleration of the electric vehicles is restrained to prevent deterioration of the battery and to prolong the battery life. Furthermore, a large amount of energy during deceleration of the vehicles is sent back to the capacitor 110 and is later used as energy for acceleration of vehicles. So, the burden of the battery during acceleration of vehicles is lightened, whereby the utilization efficiency of the battery is improved, and accordingly, the travelable distance of the electric vehicles is increased and the acceleration and deceleration performances are both improved.

The power supply apparatus disclosed in Japanese patent application laid-open No. Hei 4-340301, however, has the following problem. When electric vehicles are accelerated and decelerated while running, the amount of electric current flowing from the battery varies. Especially when the electric vehicles are rapidly accelerated, the battery current drastically varies, thereby remarkably increasing current pulsations of the battery.

Moreover, the hybrid power supply apparatus disclosed in Japanese Patent application laid-open No. Hei 5-30608 also has the following problem. A capacitor of high capacitance and the battery are connected in parallel without any means of controlling the ratio of the power to be supplied to the motor from the capacitor to that to be supplied to the motor from the battery. Therefore, when the electric vehicles are rapidly accelerated, there is a possibility that a large amount of current flows from not only the capacitor but also the battery, and in such a case, the battery current greatly varies to increase current pulsations of the battery.

Assuming that the battery volume E (t) is constant, the internal loss of the battery is expressed by:

$$\text{loss} = \int I(t)^2 \, R \, dt$$

wherein I (t) is electric current and R is internal resistance of the battery.

Namely, the internal loss is in proportion to the square of the electric current of the battery. This equation shows that when an equal energy is supplied within a given period of time, the internal loss of the battery increases in the case of large current pulsations, as compared with the case of small current pulsations. The internal loss of the battery can be decreased by reducing the current pulsations thereof. In the case of batteries of the identical capacitance, the dischargeable capacitance thereof can be increased by restraining the current pulsations thereof.

FIGS. 13 through 15 are circuit diagrams of conventional power supply apparatuses for electric vehicles. FIGS. 16 through 18 show variations of battery current with time in the running mode of LA#4. The running mode of LA#4 means a general running pattern for use in measurement of the electric vehicles. Point A denotes the electric current when the electric vehicle is rapidly accelerated.

FIG. 13 illustrates the circuit diagram of the power supply apparatus disclosed in Japanese Patent application No. Hei 4-340301, of which the capacitor C1 is of a small capacitance. With this arrangement, the electric current to be supplied to a motor M from a battery E (120 V) is controlled by a chopper composed of the capacitor C1 (5 mF), a motor drive switch, a motor brake switch, a diode, and a coil. FIG. 14 illustrates a power supply apparatus of which the capacitor C1 is of a large capacitance (30 F). In the power supply apparatus of FIG. 15, a diode is further added to the apparatus of FIG. 14 for preventing the collection of electric current by the battery. In FIG. 16, current pulsations are entirely on a large scale. At the point A, an electric current of about 220 A flows. In FIG. 17, peaks of current pulsations of the battery are reduced, as compared with those of FIG. 16. However, upon rapid acceleration, a large amount of current of about 150 A flows. In FIG. 18, the waveform of positive current is identical to that of FIG. 17, however, the entire current pulsations are reduced, since the diode prevents the battery from collecting the current. Similarly to the case of FIG. 17, upon rapid acceleration, a large amount of current of about 150 A flows. The above results show that the capacitor of a high capacitance enables the increase of dischargeable capacitance, but even in such a case, there is a possibility that a large amount of current flows from the battery, whereby internal loss of the battery cannot be perfectly prevented.

In the hybrid power supply apparatus disclosed in Japanese Patent application laid-open No. Hei 5-30608, there is a possibility that a leakage current flows from the capacitor of a large capacitance while an electric vehicle is parked for a long period of time. This causes the electrical potential of the capacitor of a large capacitance to be decreased, and a large amount of current to flow from the battery to the capacitor of a large capacitance at an engine-starting time of an electric vehicle, which obstructs effective use of energy from the battery.

In addition, in order to further decrease the internal loss of the battery for increasing the dischargeable capacitance thereof, the present inventors have contemplated to connect motor control means to the battery directly or to change over it to connect to the chopper and the capacitor of a large capacitance in accordance with the running state of the electric vehicle. With this arrangement, however, the capacitor of a large capacitance does not operate while the electric vehicle is continuously running on an upslope or running in the power mode, which causes the frequency in use of the battery to be increased. As a result, there is a limit to the increase of the travelable distance of an electric vehicle on one battery charge.

Furthermore, when the current pulsations of the battery are on a large scale, the dischargeable capacitance thereof decreases. Accordingly, in this case, if an electric current is supplied from the battery in response to the variation of a load, the battery discharge proceeds, which requires the battery charge in a short period of time.

SUMMARY OF THE INVENTION

Accordingly, it is an object of the present invention to provide a power supply apparatus for an electric vehicle, which increases the dischargeable capacitance of the battery by further decreasing the internal loss thereof, thereby extending the travelable distance of the electric vehicles.

It is another object of the present invention to provide a power supply apparatus for an electric vehicle, of which the utilization efficiency is improved by decreasing a leakage current from a capacitor while parking.

It is still another object of the present invention to provide a power supply apparatus which enables the operation mode to be changed over to an appropriate mode in accordance with the running state of an electric vehicle, and increases the utilization factor of a capacitor of a large capacitance, thereby improving the running performance of an electric vehicle.

It is further object of the present invention to provide a power supply apparatus which prevents a battery of an electric vehicle from emitting electric current in response to current pulsations of a load.

A first aspect of a power supply apparatus of an electric vehicle in accordance with the present invention is characterized in that the apparatus includes a battery, a capacitor connected to the battery via a coil, thereby supplying power to an electric load of the electric vehicle.

A second aspect of a power supply apparatus of an electric vehicle in accordance with the present invention is characterized in that the apparatus includes a battery, a first coil of which one end is connected to a plus terminal of the battery, and a first capacitor connected between the other end of the first coil and a minus terminal of the battery.

In a preferred embodiment of the second aspect of the present invention, a second coil and a second capacitor, which are connected in series, are connected between both ends of the first capacitor.

A third aspect of a power supply apparatus of an electric vehicle in accordance with the present invention is characterized in that the apparatus includes a first battery, a first coil of which one end is connected to a plus terminal of the first battery, a first capacitor of high responsivity, which is connected between the other end of the first coil and a minus terminal of the first battery, a second coil of which one end is connected to the other end of the first coil, a second capacitor of high capacitance, which is connected between the other end of the second coil and the minus terminal of the first battery, a third coil of which one end is connected to the other end of the second coil, and a second battery connected between the other end of the third coil and the minus terminal of the first battery.

A fourth aspect of a power supply apparatus of an electric vehicle in accordance with the present invention is characterized in that the apparatus includes a battery, a coil, a switching element connected between a plus terminal of the battery and one end of the coil to periodically open and close for controlling a voltage between the other end of the coil and a minus terminal of the battery, a first diode of which an anode end is connected between the switching element and the coil, and a cathode end is connected to the minus terminal of the battery, a capacitor of a large capacitance, which is connected between the other end of the coil and the minus terminal of the battery, and motor control means connected to both ends of the capacitor of a large capacitance for controlling a motor of an electric vehicle based on an accelerator operation signal or a brake operation signal.

In a preferred embodiment of the fourth aspect of the present invention, the motor control means includes a second diode adapted to feed an electric current from the motor to the capacitor, and a third diode adapted to feed an electric current from the capacitor to the battery.

In another preferred embodiment of the fourth aspect of the present invention, the apparatus further includes change-over means adapted to change over the connection of one end of the motor control means to one of connection points between the plus terminal of the battery and the switching element and between the capacitor and the coil.

In still another preferred embodiment of the fourth aspect of the present invention, the change-over means includes change-over control means adapted to select the connection of the one end of the motor control means in accordance with the running state of the electric vehicle to automatically change-over to the selected connection.

A fifth aspect of a power supply apparatus of an electric vehicle in accordance with the present invention is characterized in that the apparatus includes a battery, a capacitor of a large capacitance, motor control means connected to both ends of the capacitor for controlling a motor of the electric vehicle based on an accelerator operation signal or a brake operation signal, current limit means of which one end is connected between the motor control means and the capacitor for limiting the electric current flowing to the capacitor, thereby limiting the voltage of the capacitor, change-over means which changes over the connection of the motor control means to one of a plus terminal of the battery, and the other end of the electric current limit means, and change-over control means which controls the change-over of the change-over means, the change-over control means selecting one of the connection of the plus terminal of the battery to the other end of the current limit means, and that of the plus terminal of the battery to one end of the motor control means.

According to a fifth embodiment of the present invention, the current limit means is composed of an armature coil of the motor, and the motor control means includes a switching element for controlling the voltage of the capacitor by means of a chopper or invertor.

A sixth aspect of a power supply apparatus in accordance with the present invention is characterized in that the apparatus includes a battery, motor control means for controlling power from the battery and supplying controlled power to a motor of an electric vehicle, a chopper composed of a switching element which turns an output current of the battery on and off, a coil which smooths an intermittent current from the switching element, and a free wheel diode connected to the switching element in parallel, a capacitor of a large capacitance, which is connected to an output end of the chopper in parallel, and change-over means having a first change-over position adapted to compose a first parallel connection circuit with the capacitor and the chopper, a second change-over position adapted to compose a second parallel connection circuit with the battery and the capacitor, and a third change-over position adapted to be directly connected to an output terminal of the battery, the change-over means being connected to the motor control means, whereby a line voltage to be applied to the motor control means is changed over in accordance with the selection of one of the change-over positions by the change-over means.

In a preferred embodiment of the sixth aspect of the present invention, the apparatus further includes change-over control means which automatically controls the change-over means to change over to one of the change-over positions in accordance with the running state of the electric vehicle.

A seventh aspect of a power supply apparatus in accordance with the present invention is characterized in that the apparatus includes a battery, motor control means for controlling power from the battery and supplying controlled power to a motor of an electric vehicle, a chopper composed of a switching element which turns an output current from the battery on and off, a coil which smooths an intermittent current from the switching element, and a free wheel diode connected to the switching element in parallel, and a capacitor of a large capacitance which is connected to an output side of the chopper in parallel, first switch means for connecting the motor control means to a connection point of an input end of the chopper and the battery, and second switch means for connecting the motor control means to a connection point of an output end of the chopper and the capacitor.

In preferred embodiments of the sixth and seventh aspects of the present invention, each apparatus further includes a diode of which an anode end is connected to a connection point of the switching element of the chopper and coil, and a cathode end is connected to a connection point of the battery and the switching element to supply a charge current to the battery.

In another preferred embodiments of the sixth and seventh aspects of the present invention, each apparatus further includes a coil between the input end of the chopper and the battery for smoothing an output current of the battery.

In the apparatus of the present invention, the capacitor of a large capacitance refers to a capacitor having a capacitance of about 0.1 F or more, and preferably, 10 to 50 F.

With the first aspect of the present invention, the capacitor is normally charged by the battery via the coil. When an applied load does not vary, power is supplied to the side of the load from the battery via the coil. When an applied load varies, power is first supplied to the side of the load from the capacitor. This causes current pulsations of the battery to be restrained, and the dischargeable capacitance of the battery to be increased.

With the second aspect of the present invention, the first capacitor is normally charged by the battery via the first coil. When the applied load does not vary, power is supplied to the side of the load from the battery via the first coil. When the applied load varies, power is first supplied to the side of the load from the first capacitor. This causes current pulsations of the battery to be restrained, and the dischargeable capacitance of the battery to be increased.

With the preferred embodiment of the second aspect of the present invention, when a load is connected to both ends of the first capacitor, discharge occurs in the first capacitor, the second capacitor and the battery in this order or the order of the first capacitor, the battery and the second capacitor. When a load is connected to both ends of the second capacitor, discharge occurs in the second capacitor, the first capacitor, and the battery in this order. In any case, the first capacitor discharges prior to the battery. Therefore, current pulsations of the battery are restrained and the dischargeable capacitance of the battery is increased. In the case that the capacitance of each capacitor is small, the total capacitance can be made equal to the capacitance of a single capacitor of a large capacitance. The cost of the capacitor increases in proportion to the square of increase of the capacitance thereof. Accordingly, two capacitors of a middle capacitance can be prepared at a low cost, as compared with a single capacitor of a large capacitance so that the apparatus of the third aspect of the present invention is inexpensive, light weight and compact. By connecting the load to both ends of the first capacitor such that the inductance of the second coil is smaller than that of the first coil, discharge occurs in the first capacitor, the second capacitor and the battery successively. Namely, discharge occurs in the first capacitor prior to the battery, which is more advantageous.

With the third aspect of the present invention, in the case that the total inductance of the second coil and the third coil is less than the inductance of the first coil, discharge occurs in the first capacitor, second capacitor, second battery, and first battery successively. This causes the first capacitor to operate in response to instantaneous load variations with good responsivity, the second capacitor to operate in response to load variations of larger scales, and the second battery to operate in response to load variations continuing over a long time. As a result, the first battery can continue feeding a constant electric current, which increases the dischargeable capacitance of the battery.

With the preceding aspects of the present invention, current pulsations of the battery can be restrained, and the discharge capacitance thereof is increased so that electric vehicles can travel a longer distance.

Furthermore, with the third aspect, current pulsations of the first battery due to load variations rarely occur, and accordingly, discharging of the first battery can be performed at a maximum efficiency. This enables the electric vehicles to travel a much longer distance.

With the fourth aspect of the present invention, the capacitor of a large capacitance is charged via the battery, switching element and coil. Power is supplied to the motor from the capacitor via the motor control means. The motor control means calculates the most suitable motor state based on the accelerator or brake operation to control the motor. Accordingly, with the accelerator or brake operation by a driver, the electric vehicle can be accelerated and decelerated. Even in the case that an electric current to be fed to the motor has current pulsations of a large scale due to load variations caused by the acceleration or deceleration of the electric vehicle while running on the streets, it is sufficient for the battery to feed a constant current of an intermittent waveform since a necessary current is fed from the capacitor having a large capacitance. This causes the variations of discharge current from the battery to be decreased and smoothed, and accordingly the internal loss of the battery to be reduced. At this time, the internal loss of the capacitor having a large capacitance increases, but the internal resistance thereof is very small, as compared with that of the battery. This results in the dischargeable capacitance being increased.

With the first preferred embodiment of the fourth aspect of the present invention, when the electric vehicle runs on continuous uphills, or braking operations are performed, the motor control means brakes the motor, charges the capacitor of a large capacitance via the second diode, and supplies a regenerative current to the battery via the third diode to charge the battery. Namely, the kinetic energy of the motor is converted to the electric energy of the capacitor of a large capacitance and the battery, and regenerative braking is performed.

With the second preferred embodiment of the fourth aspect of the present invention, by connecting one end of the motor control means between the capacitor of a large capacitance and the coil, the dischargeable capacitance is increased. And by connecting one end of the motor control means between the plus terminal of the battery and the switching element, the battery is directly connected to the motor control means. With this arrangement, the internal loss of the battery is increased due to current pulsations caused by load variations to decrease the dischargeable capacitance thereof, however, the motor can be driven with a high load over a long period of time. Drivers can select the connection state of the motor control means to connect it between the plus terminal of the battery and the switching element or between the capacitor of a large capacitance and the coil, and arbitrarily change over the above connection, whereby they can select a desired driving state.

With the third preferred embodiment of the fourth aspect of the present invention, while the electric vehicle is normally running, the apparatus charges the capacitor of a large capacitance from the battery via the switching element and the coil, and supplies power to the motor control means from the capacitor of a large capacitance to operate the motor, whereby the travelable distance can be extended.

However, while the electric vehicle is continuously driven with a high load upon running continuously uphill, for example, the capacitor of a large capacitance is in the continuously discharging state, and the potential thereof is decreased. In order to prevent the potential of the capacitor of a large capacitance from decreasing under the standard minimum voltage for operating the motor, the energy to be supplied to the capacitor of a large capacitance from the battery must be not less than the total of the energy to be supplied to the motor control means from the capacitor of a large capacitance, and the energy to be lost in the capacitor of a large capacitance, switching element, and coil. If the high load state continues and the voltage of the capacitor of a large capacitance is decreased below the reference minimum voltage, the switching element, coil, diodes and capacitor of a large capacitance do not operate to smooth the current pulsations. Accordingly, with this arrangement, in order to enable the smooth running without power consumption in the switching element and coil, the one end of the motor control means is automatically connected between the plus terminal of the battery and the switching element, thereby connecting the battery to the motor control means directly.

With the fourth aspect of the present invention, the dischargeable capacitance of the battery is increased. The coil, switching element, and diode are provided between the capacitor of a large capacitance and the battery, thereby controlling the electric current flowing from the battery to a constant amount. This causes current pulsations of the battery to be decreased even when the electric vehicle is rapidly accelerated, and accordingly, internal loss of the battery to be reduced, whereby the dischargeable capacitance of the battery can be increased. As a result, the travelable distance can be greatly increased, as compared with that of the conventional electric vehicles, and a constant travelable distance can be obtained under any running state.

With the first preferred embodiment of the fourth aspect of the present invention, the capacitor of a large capacitance are sufficiently charged via the second diode while regenerative braking. Since the regenerative current flows into the battery by means of the third diode, excess regenerative current is prevented from flowing into the capacitor of a large capacitance, thereby not imposing a burden on the capacitors of a large capacitance. Furthermore, it is unnecessary to increase the withstand voltage of the capacitor of a large capacitance so that the production costs thereof can be decreased.

With the second preferred embodiment of the fourth aspect of the present invention, drivers can freely operate the change-over means.

With the third preferred embodiment of the fourth aspect of the present invention, while the electric vehicle is driven with a continuous high load when running continuously uphill, for example, the control means automatically operates the change-over means to directly connect the motor control means to the battery, thereby preventing power from being consumed by the coil, switching element and diode and realizing a smooth drive even when the electric vehicle is driven with a high load. During this period, the capacitor of a large capacitance is charged. When the electric vehicle becomes impossible to further travel while being driven with a continuous high load, the change-over means operates to supply power to the motor control means from the capacitor of a large capacitance again, thereby enabling the driving at a low speed.

With the fifth aspect of the present invention, when the control means is started, the change-over means operates in accordance with the voltage of the capacitor of a large capacitance. When the change-over means operates to connect the plus terminal of the battery to the other end of the current limit means, an electric current flows from the battery to the capacitor of a large capacitance via the current limit means. The current limit means limits the above electric current, thereby preventing excess current from flowing from the battery. When the change-over means operates to connect the plus terminal of the battery to the one end of the motor control means, the motor control means, battery and the capacitor of a large capacitance are connected in parallel so that power is supplied to the motor control means from both the capacitor of a large capacitance and the battery. With this arrangement, when the motor control means requires a large current, the capacitor of a large capacitance supplies a large current to the motor control means while the battery always supplies a constant current to the motor control means.

With the first preferred embodiment of the fifth aspect of the present invention, when the potential of the capacitor of a large capacitance is low, the chopper or the switching element within the invertor, which acts as the motor control means, is periodically open and closed to charge the capacitor of a large capacitance via the coil within the motor.

With the fifth aspect, by virtue of the capacitor of a large capacitance, current pulsations of the battery can be reduced and the travelable distance of the electric vehicle can be extended. If the voltage of the capacitor of a large capacitance decreases due to the leakage current therefrom while parking for a long period of time, the control means starts to charge the capacitor of a large capacitance via the current limit means. With this arrangement, a large current is prevented from flowing to the capacitor of a large capacitance from the battery, thereby preventing deterioration of the battery.

With the first preferred embodiment of the fifth aspect of the present invention, by using the coil and the switching element in common, the resultant power supply apparatus becomes lightweight and the production costs thereof become inexpensive.

With the sixth aspect of the present invention, when the electric vehicle is driven in the normal running mode, the change-over means is at the first change-over position. At this position, the first parallel circuit of the chopper and capacitor of a large capacitance operates as the power supply means, and the motor control means controls the motor. While the electric vehicle is driven in the power mode or on continuous uphills, a large driving force is required. In such a case, the change-over means is changed over to the second change-over position where the second parallel circuit of the battery and capacitor of a large capacitance operates as the power supply means. When the change-over means is in the transition state from the first change-over position to the second change-over position, that is a third change-over position, the motor control means is directly connected to the battery to ensure a sufficient time for charging the capacitor of a large capacitance.

The motor control means calculates the most suitable motor state in accordance with the accelerator or braking operation of drivers, for example, and controls the motor based on the calculated motor state to control the acceleration and deceleration of the electric vehicle. While the electric vehicle is running continuously downhill or is braking, the motor control means brakes the motor, and charges the capacitor of a large capacitance.

With the first preferred embodiment of the sixth aspect of the present invention, one of the first, second and third change-over positions is automatically selected in accordance with the running state of the electric vehicle so that the ability of the battery can be utilized to the maximum limit. Instead, such an arrangement that the change-over position is arbitrarily selected by a driver of the electric vehicle will do. With this arrangement, the driver can select his desired driving state.

With the seventh aspect of the present invention, the first and second switching means compose the change-over means. By on-off operation of the first and second switch means, one of three change-over positions is set. The first and second switch means can be constituted so as to automatically operate the change-over control in accordance with the running state of the electric vehicle.

With the second preferred embodiment of the sixth aspect of the present invention or the first preferred embodiment of the seventh aspect of the present invention, a regenerative current is supplied to not only the capacitor of a large capacitance but also the battery via the diode to charge the battery. Namely, the kinetic energy of the motor is converted to the electric energy of the capacitor of a large capacitance and the battery, whereby a regenerative braking is performed.

With the third preferred embodiment of the sixth aspect of the present invention or the second preferred embodiment of the seventh aspect of the present invention, the coil connected to the input end of the chopper also reduces minute ripples added to the output of the battery due to the operation of the chopper, whereby the dischargeable capacitance of the battery is further increased.

With the sixth aspect of the present invention, by virtue of the change-over means, the power supply for the motor control means is changed over in accordance with the first, second and third change-over positions. The first, second or third change-over position can be selected in accordance with the running state of the electric vehicle such as the normal running state, and the continuously uphill running state so that the travelable distance on one battery charge can be greatly extended, as compared with that of the conventional arrangements.

With the first preferred embodiment of the sixth aspect of the present invention, the first, second or third change-over position is automatically selected by the control means in accordance with the running state of the electric vehicle, whereby the change-over control most suitable to the properties of the battery can be performed.

With the seventh aspect of the present invention, two switch means operate as the change-over means, thereby enabling low production costs.

With the second preferred embodiment of the sixth aspect of the present invention, or the first preferred embodiment of the seventh aspect of the present invention, regenerative current is also supplied to the battery via the diode to charge the battery, whereby the electric energy can be effectively used, and running over a much longer distance becomes possible.

With the third preferred embodiment of the sixth aspect of the present invention, or the second preferred embodiment of the seventh aspect of the present invention, ripples added to the output of the battery due to the operation of the chopper are also reduced, and the dischargeable capacitance of the battery is increased, whereby running over a much longer distance becomes possible.

Other objects, features and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, embodiments will be described in detail with reference to drawings.

Figure 1:
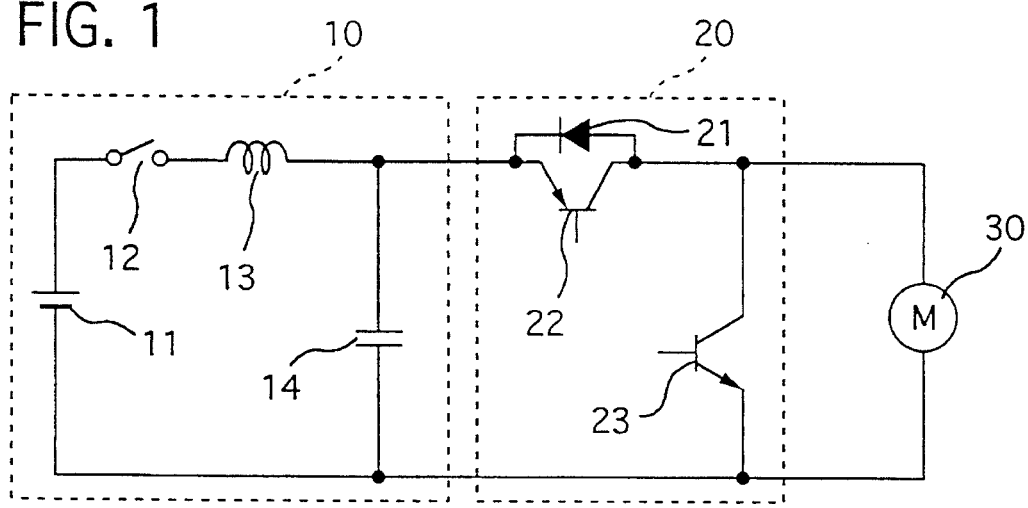
FIG. 1 is a circuit diagram of an electric vehicle according to a first embodiment of the present invention.

A first embodiment of a power supply apparatus in accordance with the present invention is illustrated in FIG. 1. As shown, a power supply apparatus 10 includes a battery 11, switch 12, coil 13 and capacitor 14.

The switch 12 is connected between a plus terminal of the battery 11 and one end of the coil 13. The capacitor 14 is connected between the other end of the coil 13 and a minus terminal of the battery 11. Power is output from both ends of the capacitor 14.

A motor drive apparatus 20 receives an output from the power supply apparatus 10 to control power to a motor 30 in transistors 22 and 23. By controlling opening and closing of the transistors 22 and 23, driving force of the motor 30 varies. Thus, the motor drive apparatus 20 controls the speed of an electric vehicle.

The load of the motor 30 varies in accordance with the road surface profile. The motor drive apparatus 20 controls the motor 30 by turning the transistors 22 and 23 on or off, which causes the electric current flowing in the motor drive apparatus 20 to pulsate sharpely. The D.C. component of resultant pulsations is fed from the battery 11 while the A.C. component thereof is fed from the capacitor 14.

While the motor 30 is stopped, the capacitor 14 is charged by the battery 11. While the electric vehicle is stopped, by turning the switch 12 off, discharge from the battery 11 to the capacitor 14 stops to prevent current consumption of the battery 11.

By inserting a diode 21 into the motor drive apparatus 20 in parallel to the transistor 22, upon braking of electric vehicle, the motor 30 acts as a generator to charge the capacitor 14. After the capacitor 14 is sufficiently charged, the battery 11 is also charged. With this arrangement, the dischargeable capacitance of the battery 11 can be increased and also charging thereof can be carried out, thereby enabling the electric vehicle to run over a longer distance.

In the first embodiment, in order to effectively prevent current pulsations of the battery 11, it is preferable that the capacitor 14 has a large capacitance. In order to obtain such a capacitor 14, it is desired to connect a plurality of capacitors in parallel or to use an electric double layered capacitor. The electric double layered capacitor is composed of two different layers which contact each other, instead of dielectric layers, and can obtain a large capacitance by using the state that electric charges are present in boundary of the two different layers so as to be spaced apart with extremely short intervals. In the case of the capacitor of a large capacitance, it is preferable to break the discharge from the battery by turning the switch 12 off while the vehicle is stopped to reduce the leakage current from the capacitor.

Figure 2:
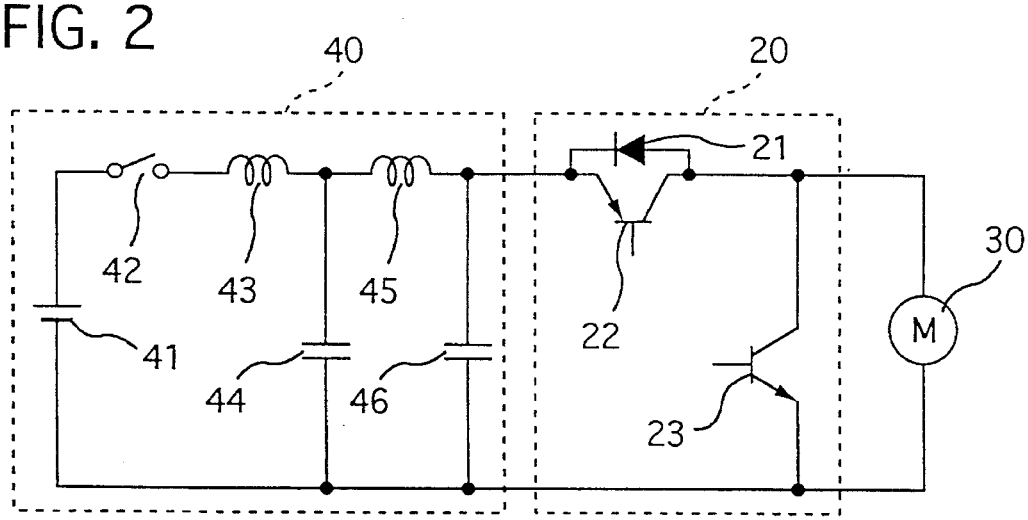
FIG. 2 is a circuit diagram of an electric vehicle according to a second embodiment of the present invention.

A second embodiment of a power supply apparatus of the present invention is illustrated in FIG. 2. As shown, a power supply apparatus 40 includes a battery 41, switch 42, first coil 43, first capacitor 44, second coil 45, and second capacitor 46. The switch 42 is connected between a plus terminal of the battery 41 and one end of the first coil 43. The first capacitor 44 is connected between the other end of the first coil 43 and a minus terminal of the battery 41. One end of the second coil 45 is connected to the other end of the first coil 43. The second capacitor 46 is connected between the other end of the second coil 45 and the minus terminal of the battery 41. Power is output from both ends of the second capacitor 46.

With the second embodiment, power due to the load variation is consumed by the second capacitor 46, first capacitor 44 and battery 41 successively. Accordingly, by setting the capacitance of the second capacitor 46 equal to that of the capacitor 14 of the first embodiment, the first capacitor 44 shares the burden with the second capacitor 46 so that current pulsations of the battery 41 is reduced and the travelable distance is further extended. Even if the capacitance of the second capacitor 46 is less than that of the capacitor 14 of the first embodiment, the first capacitor 44 shares the burden with the second capacitor to achieve the performance identical to that of the first embodiment. Normally, the cost of the capacitor rises in proportion to the square of the increase of capacitance thereof. Therefore, with this arrangement, the cost of the capacitors can be decreased. In order to improve the operational advantage of the second embodiment, third and fourth coils and capacitors may be inserted like the second coil 45 and capacitor 46.

Figure 3:
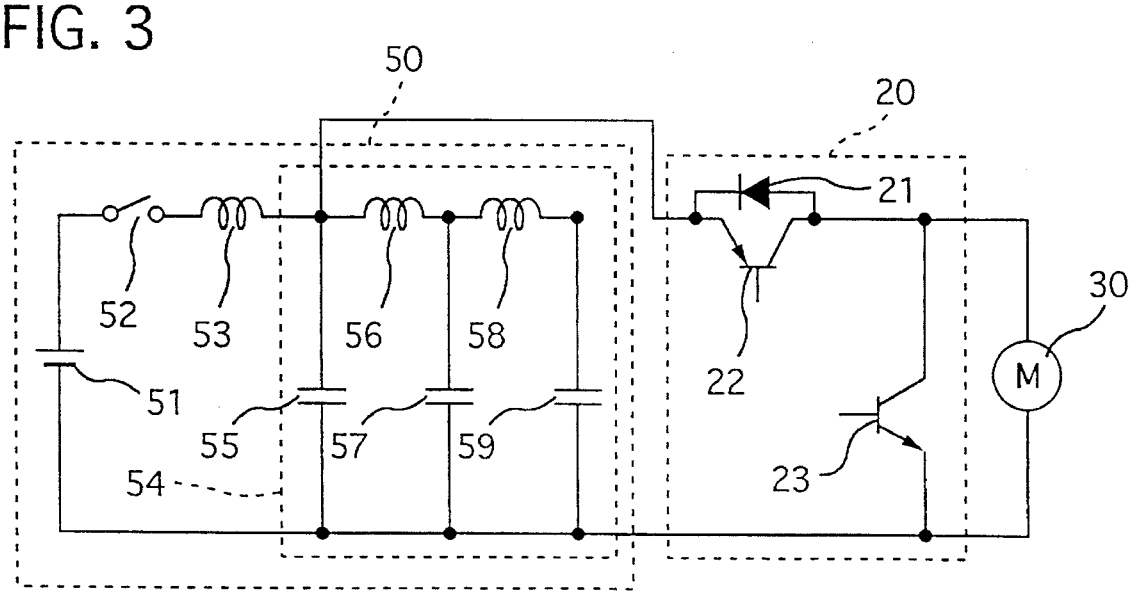
FIG. 3 is a circuit diagram of an electric vehicle according to a third embodiment of the present invention.

A third embodiment of a power supply apparatus in accordance with the present invention is illustrated in FIG. 3. As shown, a power supply apparatus 50 includes a battery 51, switch 52, first coil 53 and capacitor array 54. The switch 52 is connected between a plus terminal of the battery 51 and one end of the first coil 53. The capacitor array 54 is connected between the other end of the coil 53 and a minus terminal of the battery 51. The capacitor array 54 includes a first capacitor 55, second coil 56, second capacitor 57, third coil 58, and third capacitor 59. The first capacitor 55 is connected between the other end of the first coil 53 and the minus terminal of the battery 51. One end of the second coil 56 is connected to the other end of the first coil 53. The second capacitor 57 is connected between the other end of the second coil 56 and the minus terminal of the battery 51. One end of the third coil 58 is connected to the other end of the second coil 56. The third capacitor 59 is connected between the other end of the third coil 58 and the minus terminal of the battery 51. Power is output from both ends of the first capacitor 55.

With the third embodiment, the power due to the load variation is consumed by the capacitor array 54 and battery 51 successively. In the capacitor array 54, the first capacitor 55, second capacitor 57 and third capacitor 59 successively consume power. By increasing the capacitance of the capacitors in the order of the first capacitor 55, second capacitor 57 and third capacitor 59, the responsivity of the resultant capacitor array 54 is high, which is equivalent to that of a single capacitor of a large capacitance. Accordingly, with this arrangement, the cost is inexpensive, current pulsations of the battery 51 can be restrained, and the travelable distance can be extended. Instead of the third capacitor 59 and the third coil 58 of the capacitor array 54, a double capacitor may be used. The number of the capacitors and coils within the capacitor array 54 may be further increased.

Figure 4:
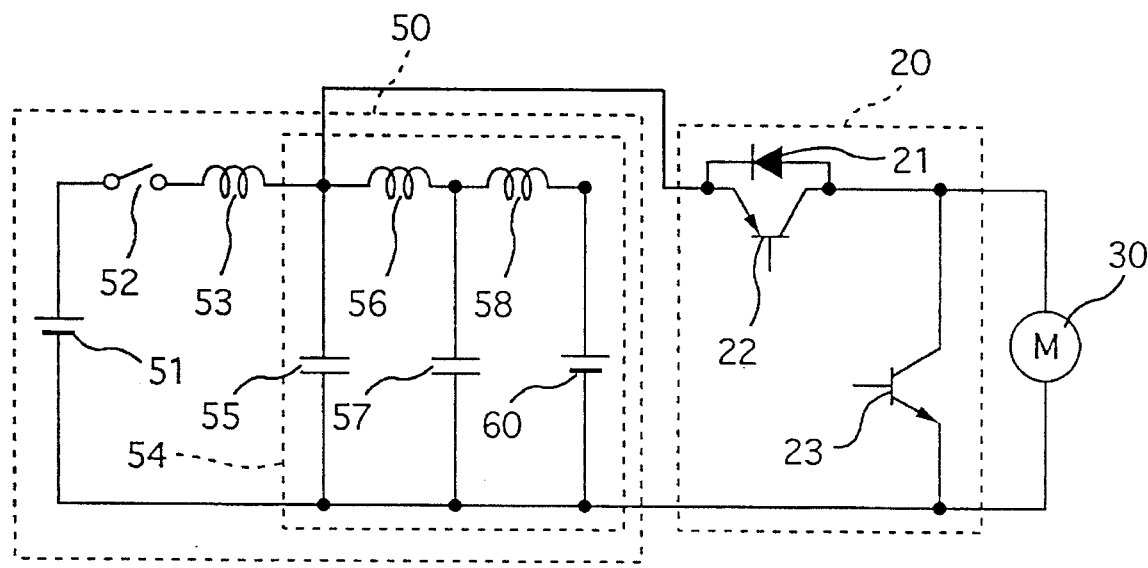
FIG. 4 is a circuit diagram of an electric vehicle according to a fourth embodiment of the present invention.

A fourth embodiment of a power supply apparatus in accordance with the present invention is illustrated in FIG. 4. As shown, in place of the capacitor 59 used in the third embodiment, a secondary battery 60 is used. The first capacitor 55 is an electrolytic capacitor and the second capacitor 57 is an electric double layered capacitor. The electrolytic capacitor has good responsivity to response quickly to the load variation. Capacitance shortage of the electrolytic capacitor is compensated by the electric double layered capacitor. Further shortage of capacitance is compensated by the secondary battery. With this arrangement, the current variation of the battery 51 due to the load variation scarcely occurs, and the loss of the battery 51 becomes the minimum, thereby enabling the electric vehicle to run over a much longer distance.

As described above, the first embodiment of the apparatus of the present invention is provided with a capacitor 14 connected to the battery 11 via the coil 13 such that power is fed from the capacitor 14. The second embodiment of the present invention is provided with capacitors 44 and 46 connected to the battery 41 via the coils 43 and 45 such that power is fed from the capacitor 46. The third embodiment of the present invention is provided with the capacitors 55, 57 and 59 which are connected to the battery 51 via the coils 53, 56 and 58 such that power is fed from the capacitor 55. The fourth embodiment of the present invention is provided with capacitors 55 and 57 and the secondary battery 60 which are connected to the battery 51 via the coils 53, 56 and 58 such that power is fed from the capacitor 55. Thus, current pulsations of the battery are restrained, and the discharge capacitance thereof is increased, thereby enabling the electric vehicle to run over a much longer distance.

Furthermore, the second embodiment of the present invention is provided with the first coil 43 of which one end is connected to the plus terminal of the battery 41, the first capacitor 44 connected between the other end of the first coil 43 and the minus terminal of the battery 41, and the second coil 45 and the second capacitor 46 which are connected in series across the first capacitor 44. The third and fourth embodiments of the present invention is provided with the first coil 53 of which one end is connected to the plus terminal of the battery 51, the first capacitor 55 connected between the other end of the first coil 53 and the minus terminal of the battery 51, and the second coil 56 and the second capacitor 57 which are connected in series across the first capacitor 55. With these arrangements, inexpensive capacitors can be used so that the power supply apparatuses 40 and 50 can be manufactured at low costs.

The fourth embodiment is provided with the battery 51, the first coil 53 of which one end is connected to the plus terminal of the battery 51, the first capacitor 55 having high responsivity, which is connected between the other end of the first coil 53 and the minus terminal of the battery 51, the second coil 56 of which one end is connected to the other end of the first coil 53, the second capacitor 57 of a large capacitance, which is connected between the other end of the second coil 56 and the minus terminal of the battery 51, the third coil 58 of which one end is connected to the other end of the second coil 56, and the secondary battery 60 connected between the other end of the third coil 58 and the minus terminal of the battery 51. With this arrangement, current pulsations of the battery due to the load variation scarcely occur, and the battery can be discharged at a maximum efficiency, thereby enabling the electric vehicle to run over a much longer distance. Furthermore, by combining the capacitor of a low capacitance having high speed responsivity (electrolytic capacitor, for example) with the capacitor of a high capacitance having low speed responsivity (electric double layered capacitor, for example), characteristics near to those of the capacitor of a large capacitance having high speed responsivity can be realized, thus the resultant apparatus is inexpensive, lightweight, and compact in construction, and exhibits high performance.

Figure 5:
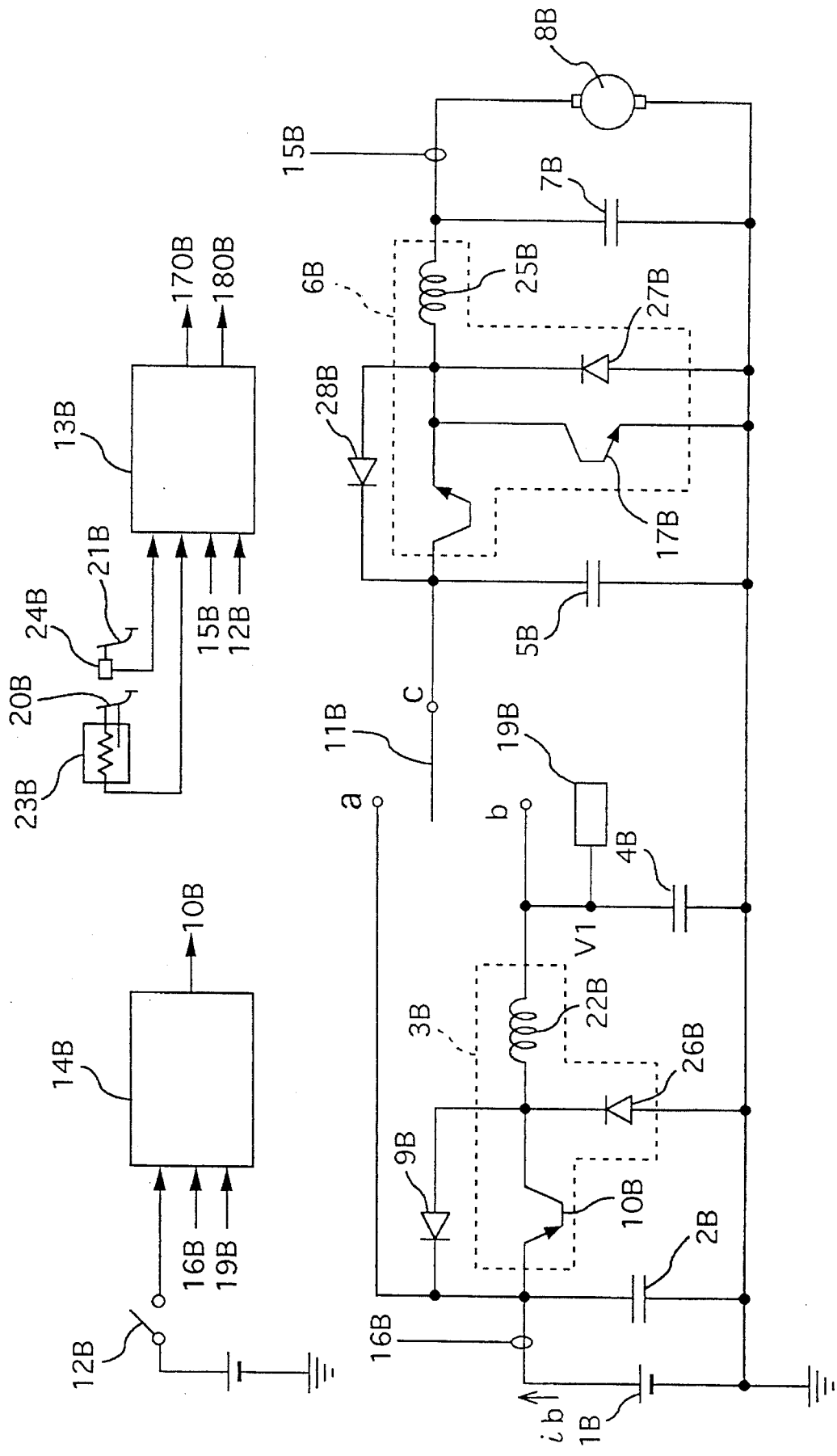
FIG. 5 is a circuit diagram according to a fifth embodiment of the present invention.

A fifth embodiment of a power supply apparatus in accordance with the present invention is illustrated in FIG. 5. As shown, a plus terminal of a battery 1B (240 V) is connected to one end of a charge control switch 10B while the other end of the charge control switch 10B is connected to both of one end of a coil 22B (1 mΩ) and an anode end of a first diode 26B at one point. A capacitor 4B of a large capacitance (30 F) is interposed between the other end of the coil 22B and a minus terminal of the battery 1B. The voltage of the capacitor 4B is detected by a voltage sensor 19B. In the present embodiment, an electric double layered capacitor is used as the capacitor 4B. The electric double layered capacitor means the capacitor using the state that electric charges are present in a boundary between contacting two different layers so as to be spaced apart with extremely short intervals, without using dielectric bodies. A third diode 9B is further provided such that an anode is connected between the charge control switch 10B and the plus terminal of the battery 1B and a cathode is connected between the charge control switch 10B and the coil 22B.

One end of a motor drive switch 180B, one end of a motor brake switch 170B, an anode of a diode 27B and one end of a coil 25B are connected to one another at one point. A D.C. motor 8B is interposed between the other end of the coil 25B and a cathode of the diode 27B. A second diode 28B is further provided such that an anode is connected to the other end of the motor drive switch 180B while a cathode is connected to the anode of the diode 27B. Terminals are respectively provided at point "a" between the charge control switch 10B and the plus terminal of the battery 1B, point "b" between the coil 22B and the capacitor 4B and point "c" between the anode of the diode 28B and the motor drive switch 180B. A bypass switch 11B is provided so as to change over the connection of point "a" and point "c" to that of point "b" and point "c" and vice versa. Electrolytic capacitors 2B, 5B and 7B (5 mF) are respectively provided between the charge control switch 10B and the plus terminal of the battery 1B, between point "c" and the D.C. motor 8B and between the coil 25B and the D.C. motor 8B in parallel to the battery 1B.

In operation, an electric current flowing from the plus terminal of the battery 1B charges the capacitor 4B via the electrolytic capacitor 2B and a first chopper 3B composed of the charge control switch 10B, coil 22B and diode 26B. Power is supplied from the capacitor 4B to the D.C. motor 8B via the electrolytic capacitor 5B, a second chopper 6B composed of the motor control switch 180B, the motor brake switch 170B, the diodes 27B and 28B and the coil 25B, and the electrolytic capacitor 7B to give a driving force to the motor 8B. The third diode 9B is provided to enable the battery 1B to collect a regenerative current obtained when the current exceeds the capacitance of the capacitor 4B upon regenerative braking of the motor 8B. The bypass switch 11B operates as change-over means to change over the power supply means for the second chopper 6B from the capacitor 4B to the battery 1B and the vice versa. With this arrangement, while an electric vehicle is running normally, the first chopper 3B and the capacitor 4B are connected to the second chopper 6B, thereby effectively using energy of the battery 1B, and while a high load is continuously applied upon running uphill, for example, the bypass switch 11B is changed over such that the battery 1B is directly connected to the second chopper 6B not via the first chopper 3B, thereby enabling smooth running of the electric vehicle. The change-over operation of the bypass switch 11B is carried out by a driver manually. The second chopper 6B controls powering and regenerating motions of the motor 8B by the operation of a motor control computer 13B, and the first chopper 3B controls the voltage to be applied to the capacitor 4B by the operation of a voltage control computer 14B.

Hereinafter, the control of the motor 8B by the motor control computer 13B will be explained.

The apparatus includes a current sensor 15B which detects the current flowing in the second chopper 6B. The current sensor 15B detects the magnetic field generated by the flowing current, and calculates the current intensity from the detected magnetic field. Detection signals from the current sensor 15B are input to the motor control computer 13B. The motor control computer 13B controls the on-off ratio of the motor brake switch 170B and the motor drive switch 180B of the second chopper 6B upon receiving the detection signals from the current sensor 15B, and controls the driving and regenerative braking of the motor 8B, as is shown by the block diagram of FIG. 6.

When a start switch 12B of an electric vehicle is turned on, the process of the motor control computer 13B starts. When an accelerator pedal 20B or brake pedal 21B is operated, the opening of the accelerator pedal 20B is detected by an opening sensor 23B, or the force applied to the brake pedal 21B is detected by a pressure sensor 24B, and detection signals are input to an accelerator opening or brake force signal input unit. In the present embodiment, the pressure sensor 24B uses strain gauges.

The object torque T corresponding to the opening of the accelerator pedal 20B or the force applied to the brake pedal 21B, and the object current I corresponding to the object torque T are calculated in an object torque calculation unit and an object current calculation unit by using the following equations:

Object torque in the case that the accelerator pedal 20B is operated: $T = k1 \times x$ (Nm)

Object torque in the case that the brake pedal 21B is operated: $T = k2 \times Tb$ (Nm)

Object current corresponding to the object torque T: $I = k3 \times T$ (A)

where x is the opening of the accelerator pedal 20B, Tb is the force applied to the brake pedal 21B, and k1, k2 and k3 are constants.

The electric current detected by the current sensor 15B is fed back to a PID control device to control the operation of the motor drive switch 180B and the motor brake switch 170B so that the current io detected by the current sensor 15B approximates the object current I.

Hereinafter, the control of the motor brake switch 170B and the motor drive switch 180B in various running states will be explained.

In the normal running state, the bypass switch 11B is changed over to be connected to the first chopper 3B composed of the charge control switch 10B, coil 22B and diode 26B, whereby the capacitor 4B is charged via the first chopper 3B to supply battery energy. In this state, the motor drive switch 180B turns on and off intermittently to feed D.C. current from the capacitor 4B to the motor 8B to turn it into the driving state, whereby wheels are being driven.

When the brake pedal 21B is operated, or braking such as engine braking is generated in a gasoline or diesel-powered vehicle while running downhill, the motor drive switch 180B is held off, and the motor brake switch 170B turns on and off intermittently. When the motor brake switch 170B is on, an electric current flows via the coil 25B and the motor brake switch 170B. When the motor brake switch 170B is off, a regenerative current flows into the capacitor 4B via the coil 25B and the diode 28B.

Figure 7:
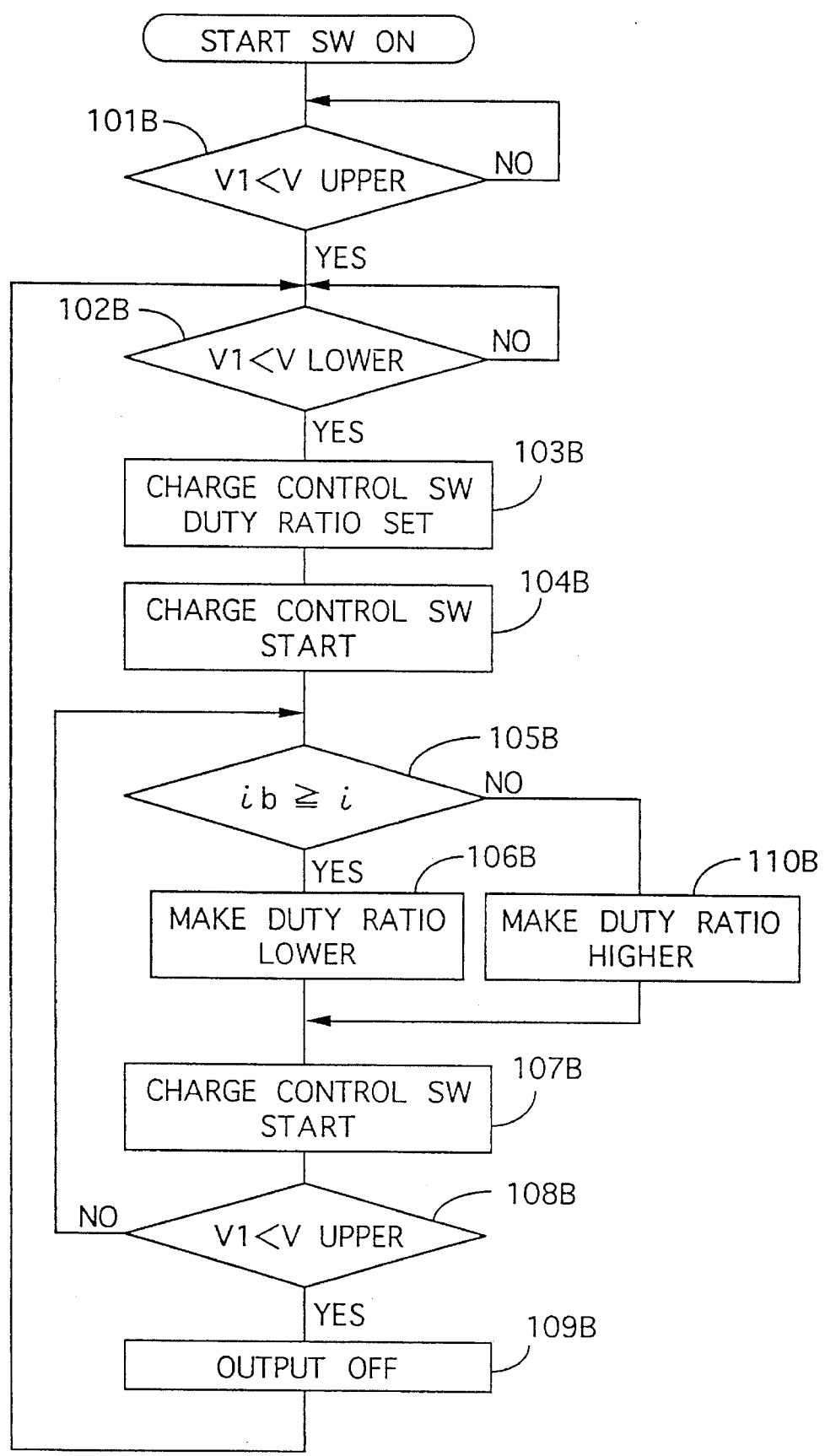
FIG. 7 is a flow chart showing the process of voltage control of a capacitor of a large capacitance in the fifth embodiment of the present invention.

The voltage control of the capacitor 4B will be explained with reference to the flow chart of FIG. 7.

The power supply apparatus includes a current sensor 16B which detects the electric current flowing to the battery 1B, and a voltage sensor 19B which detects the voltage of the capacitor 4B. Detection signals from the current sensor 16B and the voltage sensor 19B are input to the voltage control computer 14B. The current sensor 16B detects the magnetic field and calculates current intensity from the detected magnetic field, similarly to the current sensor 15B. The voltage control computer 14B is provided with a pulse width modulation device, and controls the on-off ratio of the charge control switch 10B of the first chopper 3B based on the detection signals from the current sensor 16B and the voltage sensor 19B. In the present embodiment, the on, off frequency of the charge control switch 10B is set to 50 Hz. When the start switch 12B is turned on, the voltage control computer 14B starts the voltage control of the capacitor 4B, as follows.

At Step 101B, a decision is made whether or not the voltage V1 of the capacitor 4B which is detected by the voltage sensor 19B is less than the reference maximum voltage Vupper (=battery voltage 240 V). If the voltage V1 is less than the reference maximum voltage Vupper, at Step 102B, a decision is made whether or not the voltage V1 is less than the reference minimum voltage Vlower (=200 V). If the voltage V1 is less than the reference minimum voltage Vlower, at Step 103B, the duty ratio of the charge control switch 10B is set as the reference duty ratio of 50%. Next, at Step 104B, the charge control switch 10B is operated so that the duty ratio thereof is 50%. Then, at Step 105B, a decision is made whether or not the current ib from the battery 1B is not less than the reference current i (20A). If the current ib is not less than the reference current i, at Step 106B, the duty ratio of the charge control switch 10B decreased. If the current ib is less than the reference current i, at Step 110B, the duty ratio of the charge control switch 10B is increased. At Step 107B, the charge control switch 10B is operated with the duty ratio determined at Step 106B or Step 110B. At Step 108B, a decision is made whether or not the voltage V1 of the capacitor 4B is greater than the reference maximum voltage Vupper. If the voltage V1 is greater than the reference maximum voltage Vupper, at Step 109B, electric current from the charge control switch 10B to the capacitor 4B is stopped. Returning to Step 102B, the above process is repeated, whereby the voltage of the capacitor 4B is controlled so as to be within a predetermined range.

Figure 8:
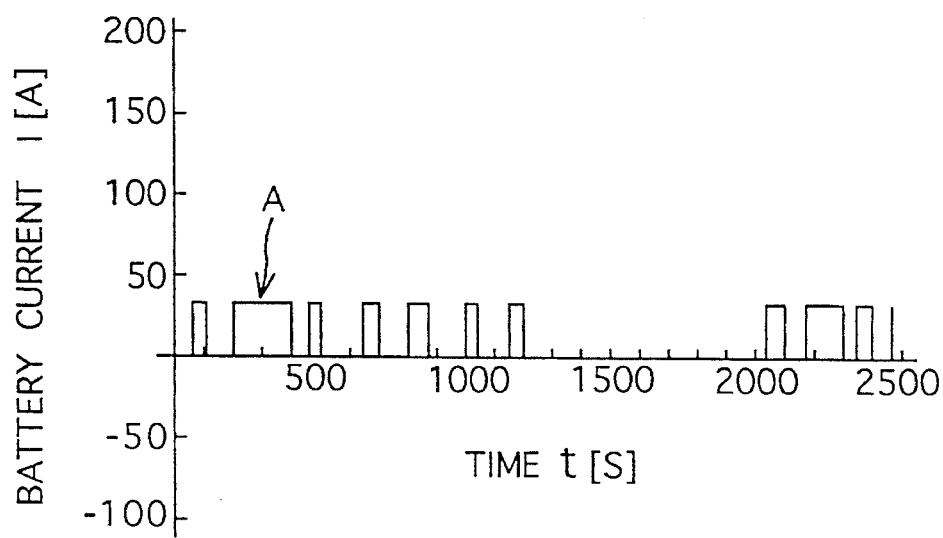
FIG. 8 is a graph showing the variation of the battery current with respect to time in the fifth embodiment of the present invention.

FIG. 8 shows the change of the battery current with time of the apparatus of the present embodiment in the running mode of LA#4 of an electric vehicle. Point A indicates the time the vehicle is rapidly accelerated.

Figure 16:
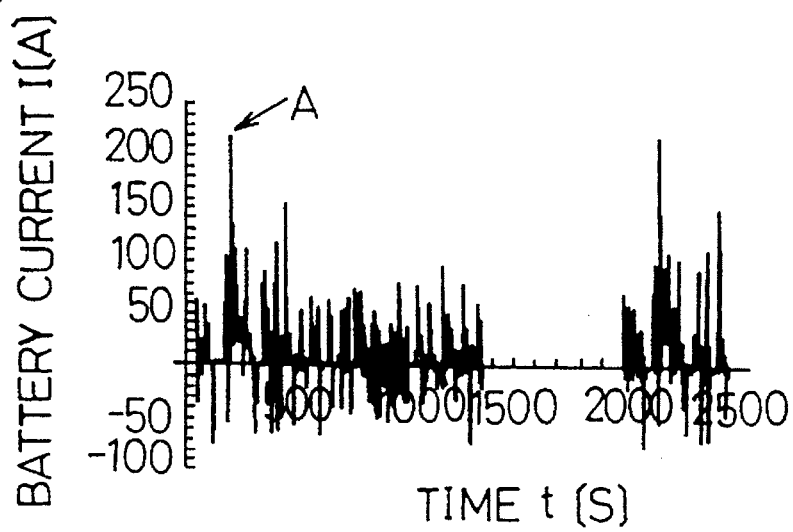
FIG. 16 is a graph showing the variation of battery current with time of the apparatus of FIG. 13.
Figure 17:
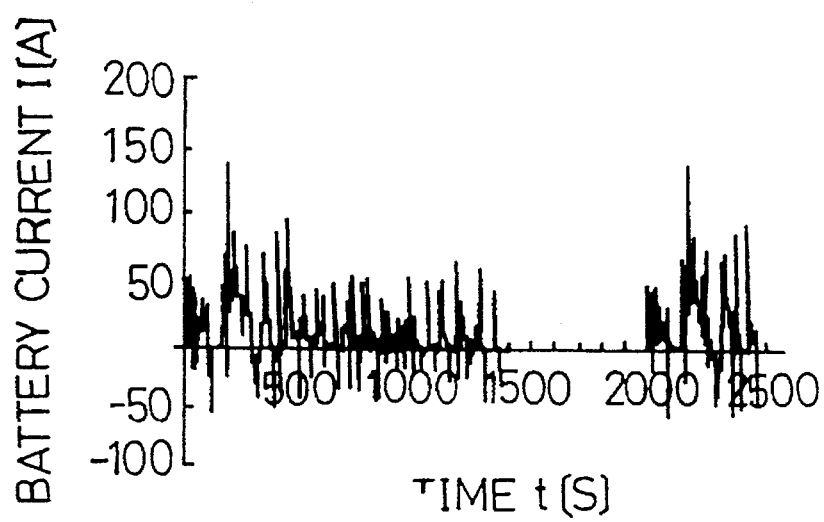
FIG. 17 is a graph showing the variation of battery current with time of the apparatus of FIG. 14.
Figure 18:
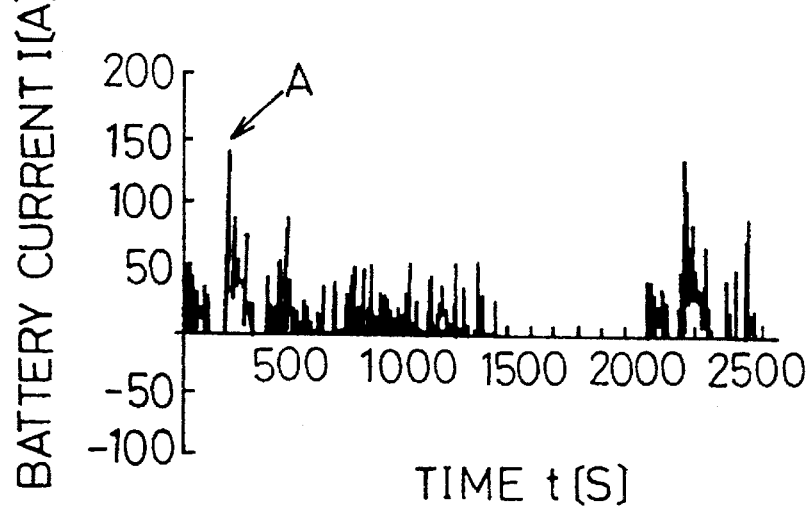
FIG. 18 is a graph showing the variation of battery current with time of the apparatus of FIG. 15.

When the vehicle is rapidly accelerated, the battery current is limited by the first chopper 3B and necessary current is fed from the capacitor 4B. Therefore, as is clearly shown in FIG. 8, the battery current is always constant. This causes the internal loss of the battery to be minimum, as compared with the graphs of FIG. 16 to 18 relating to the conventional power supply apparatus, and the dischargeable capacitance is greatly increased, as compared with the conventional power supply apparatus. This results in the travelable distance of electric vehicle on one battery charge being extended.

Figure 13:
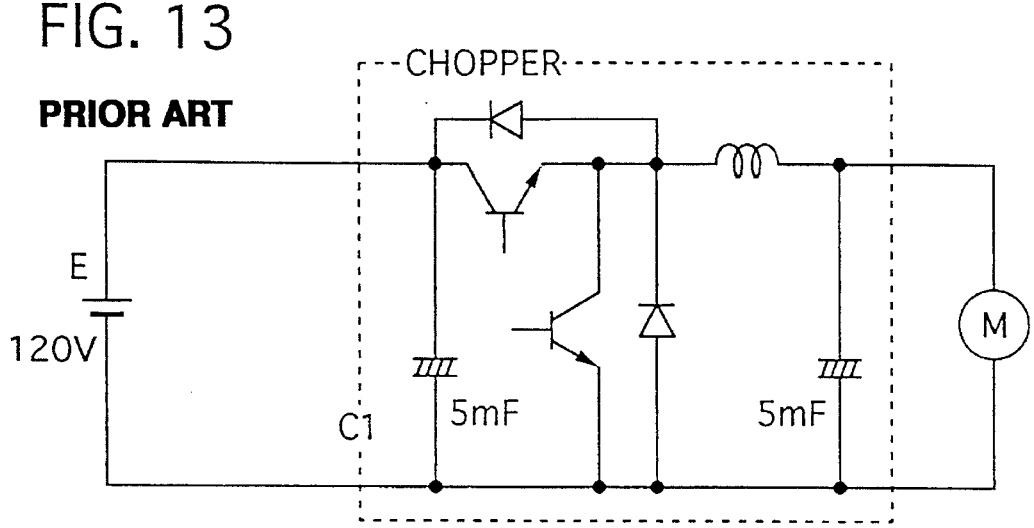
FIG. 13 is a circuit diagram of a still another conventional apparatus.
Figure 14:
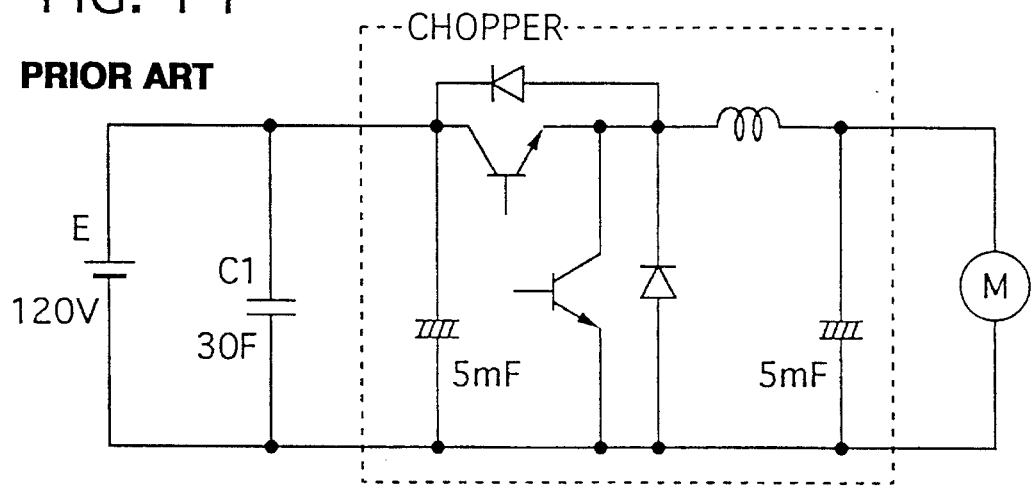
FIG. 14 is a circuit diagram of a further conventional apparatus.
Figure 15:
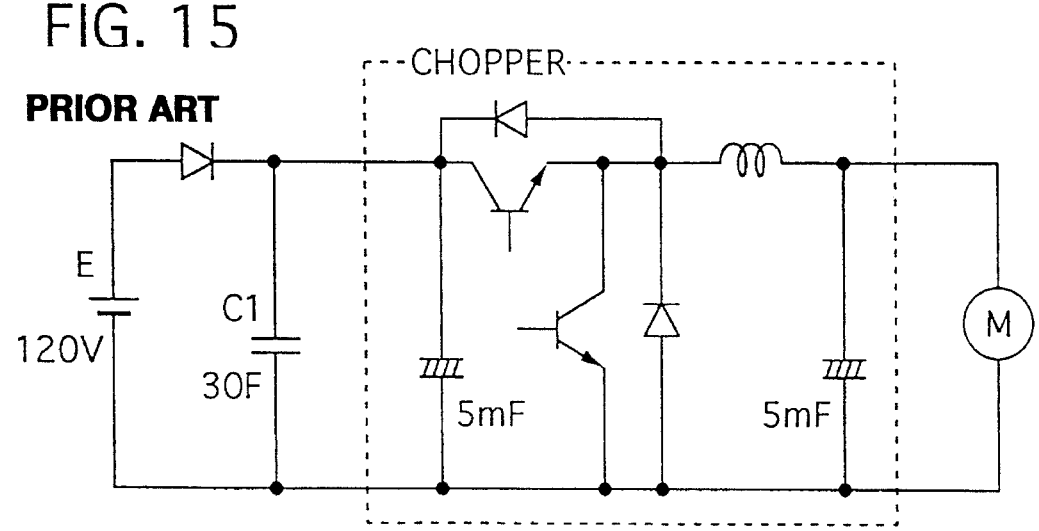
FIG. 15 is a circuit diagram of a still further conventional apparatus.
Figure 19:
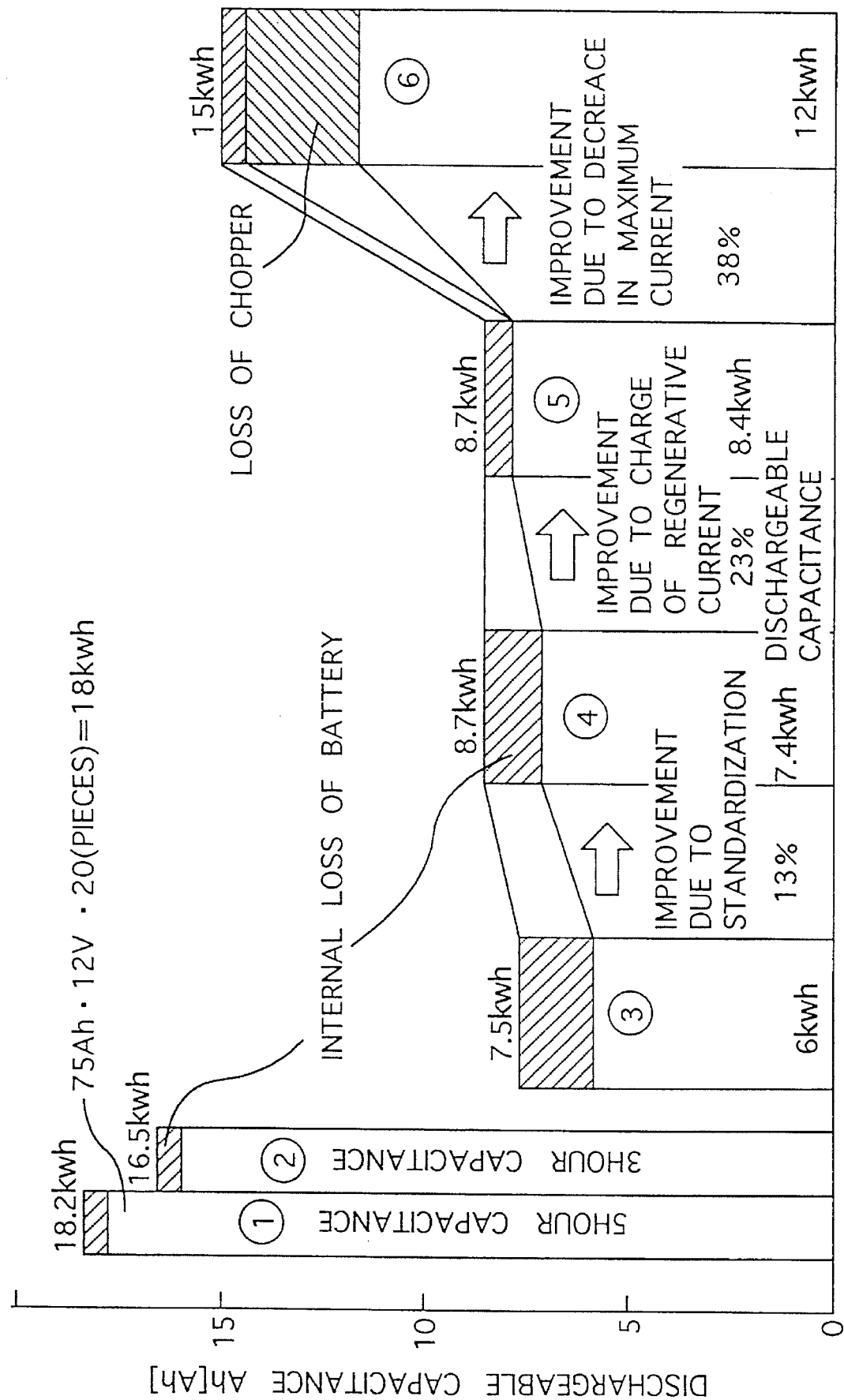
FIG. 19 is a graph showing the relation between the constitution of the apparatus and the dischargeable capacitance.

FIG. 19 is a graph showing the dischargeable capacitances in the running mode of LA#4 in various cases, which are calculated based on the graphs of FIG. 8 and FIGS. 16 to 18. ① indicates the dischargeable capacitance of the battery of 5 hour capacitance, ② indicates that of the battery of 3 hour capacitance, ③ indicates the dischargeable capacitance of the power supply apparatus of FIG. 13, ④ indicates that of the apparatus of FIG. 14, ⑤ indicates that of the apparatus of FIG. 15, and ⑥ indicates that of the apparatus of FIG. 8. ③ to ⑤ show that the dischargeable capacitance is less than the half of the rated capacitance. In contrast, in ⑥ of the present embodiment, the dischargeable capacitance is about 1.5 times as large as those of ③ to ⑤.

Hereinafter, the sixth embodiment of the present invention will be explained. The constitution of the sixth embodiment is identical to that of the fifth embodiment. In the present embodiment, the bypass switch 11B is changed over by the voltage control computer 14B so as to maintain good running state even while the electric vehicle is continuously running on uphills, for example. In such a case, the energy output from the capacitor 4B to the motor 8B is always greater than that which is supplied from the battery 1B to the capacitor 4B via the first chopper 3B. This causes the potential of the capacitor 4B to drop. When the potential of the capacitor 4B is less than the reference minimum potential, the bypass switch 11B is changed over to connect the battery 1B directly to the second chopper 6B. In this case, the battery energy cannot be effectively used, but smooth running becomes possible. If the dischargeable capacitance of the battery 1B becomes short while running with the battery 1B directly connected to the second chopper 6B, and further running becomes impossible, the bypass switch 11B is changed over from the battery 1B to the first chopper 3B to enable normal running. Then, the capacitor 4B is charged to make the potential thereof greater than the reference minimum potential by turning the charge control switch 10B on and off intermittently, or feeding a regenerative current before the second chopper 6B is connected again to both the first chopper 3B and the capacitor 4B. The remaining constitution and operation of the present embodiment are identical to those of the fifth embodiment. So, descriptions thereof will be omitted. The apparatus of the sixth embodiment is intended to automatically change over the bypass switch 11B, and for this purpose, the number of steps to be performed by the voltage control computer 14B is slightly increased. Accordingly, the circuit diagram of the sixth embodiment is obtained by merely adding an output terminal adapted to operate the bypass switch 11B to the voltage control computer of the circuit diagram of the fifth embodiment.

Figure 9:
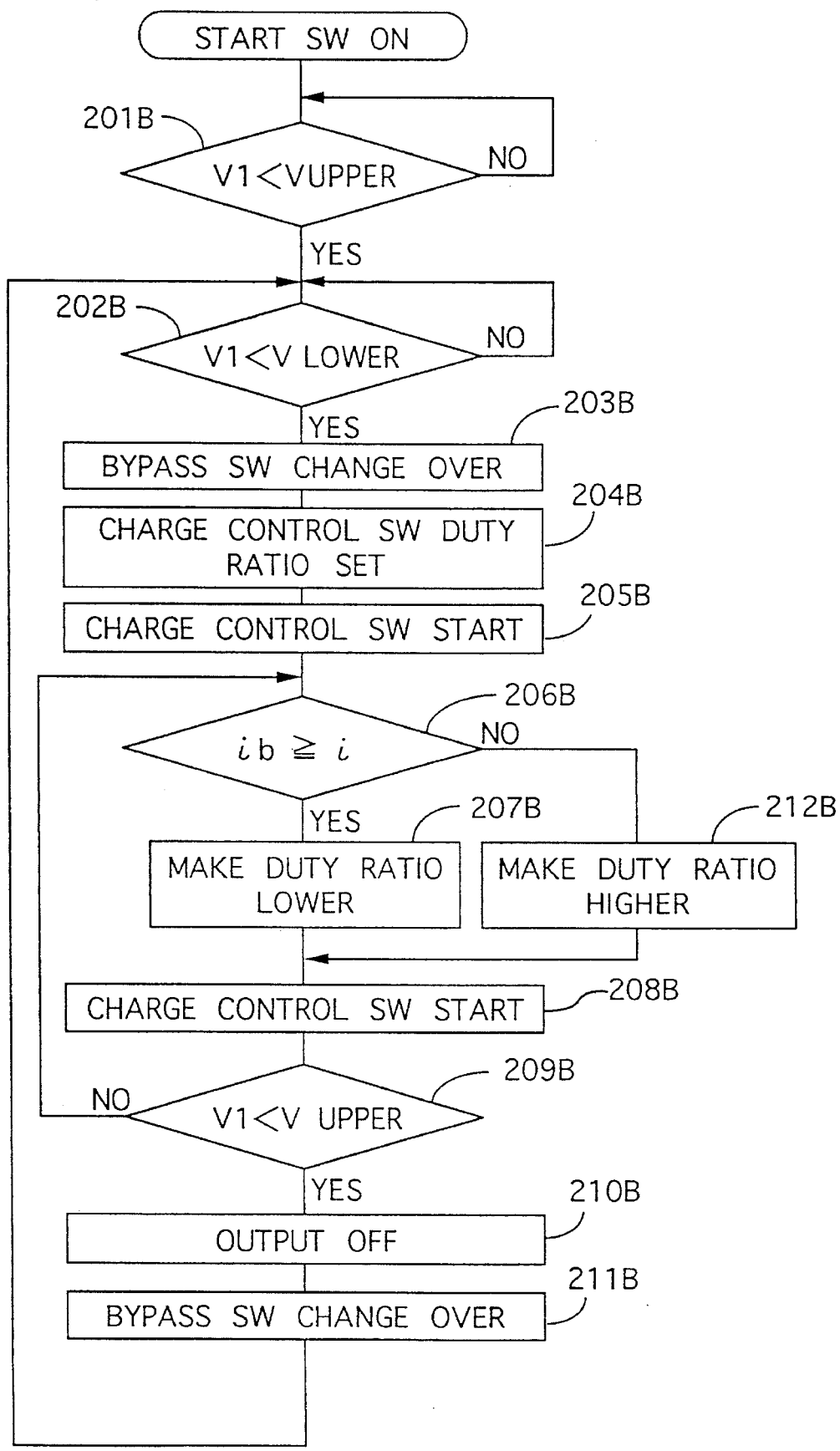
FIG. 9 is a flow chart showing the change-over of a bypass switch according to a sixth embodiment of the present invention.

The control of the voltage of the capacitor 4B and the change-over of the bypass switch 11B by the voltage control computer 14B will be explained with reference to the flow chart of FIG. 9. When the start switch 12B of an electric vehicle is turned on, the process of the voltage control computer starts. At Step 201B, a decision is made whether or not the voltage V1 of the capacitor 4B, which is detected by the voltage sensor 19B, is less than the reference maximum voltage Vupper (=battery voltage 240 V). If the voltage V1 is less than the reference maximum voltage Vupper, at Step 202B, a decision is made whether or not the voltage V1 is less than the reference minimum voltage Vlower (=200 V). If the voltage V1 is less than the reference minimum voltage Vlower, at Step 203B, the bypass switch 11B is changed over to connect the battery 1B directly to the second chopper 6B not through the capacitor 4B and the first chopper 3B. At Step 204B, the duty ratio of the charge control switch 10B is set as the reference duty ratio of 50%. At Step 205B, the charge control switch 10B is turned on or off so as to keep the duty ratio to 50%. At Step 206B, a decision is made whether or not the electric current ib from the battery 1B is not less than the reference current i (20A). If the current ib is not less than the reference current i, at Step 207B, the duty ratio of the charge control switch 10B is be decreased. If the current ib is less than the reference current i, at Step 212B, the duty ratio of the charge control switch 10B is increased. At Step 208B, the switch 10B is operated with the duty ratio determined at Step 207B or Step 212B. At Step 209B, a decision is made whether or not the voltage V1 of the capacitor 4B is greater than the reference maximum voltage Vupper. If the voltage V1 is greater than the reference maximum voltage Vupper, at Step 210B, the electric current is no longer fed to the capacitor 4B from the switch 10B, and the bypass switch 11B is changed over to supply power to the D.C. motor 8B from the capacitor 4B via the first chopper 3B. Returning to Step 202B, the above-described process is repeated so that the voltage of the capacitor 4B is always within a predetermined range.

Figure 10:
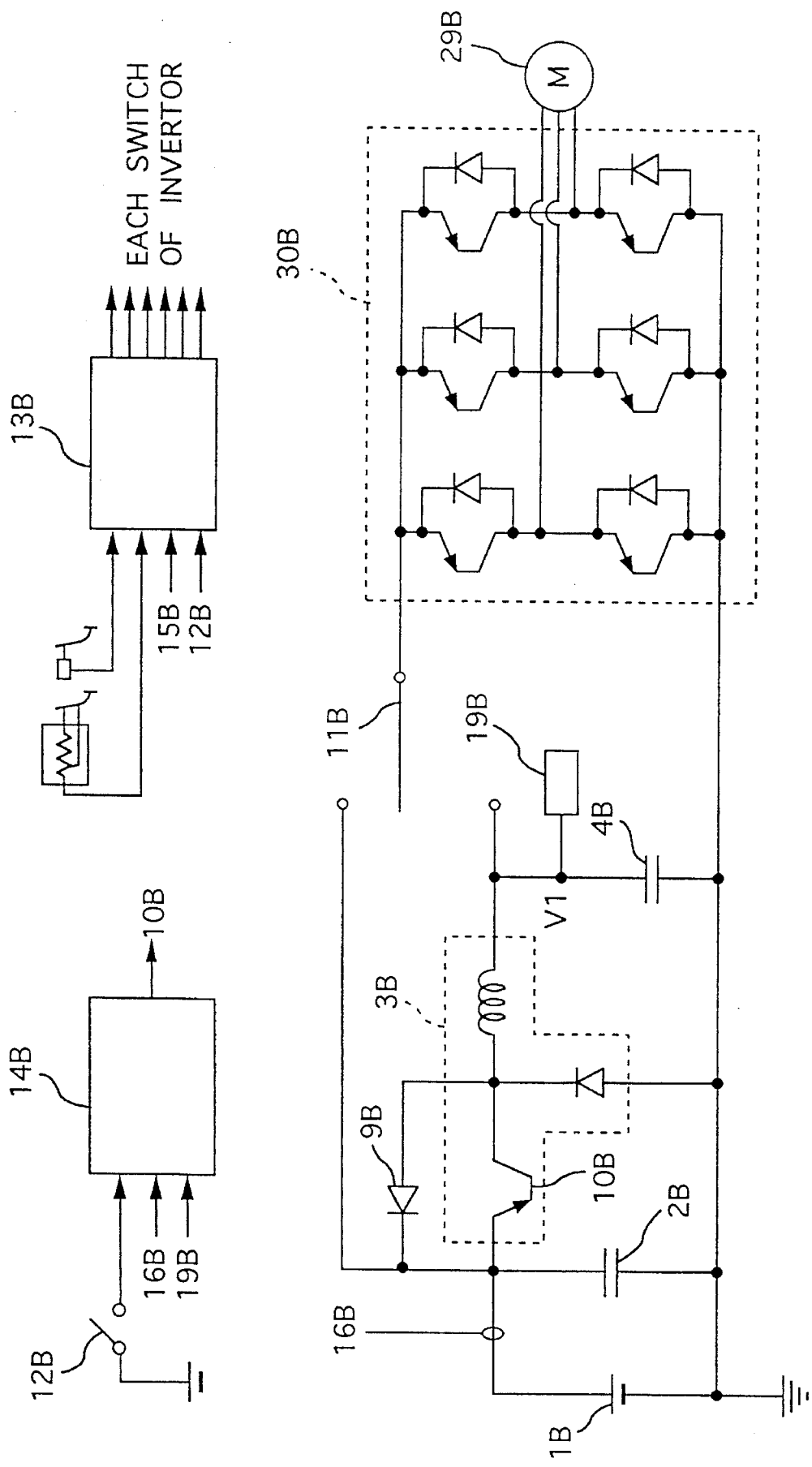
FIG. 10 is a circuit diagram of an apparatus according to a seventh embodiment of the present invention.
Figure 11:
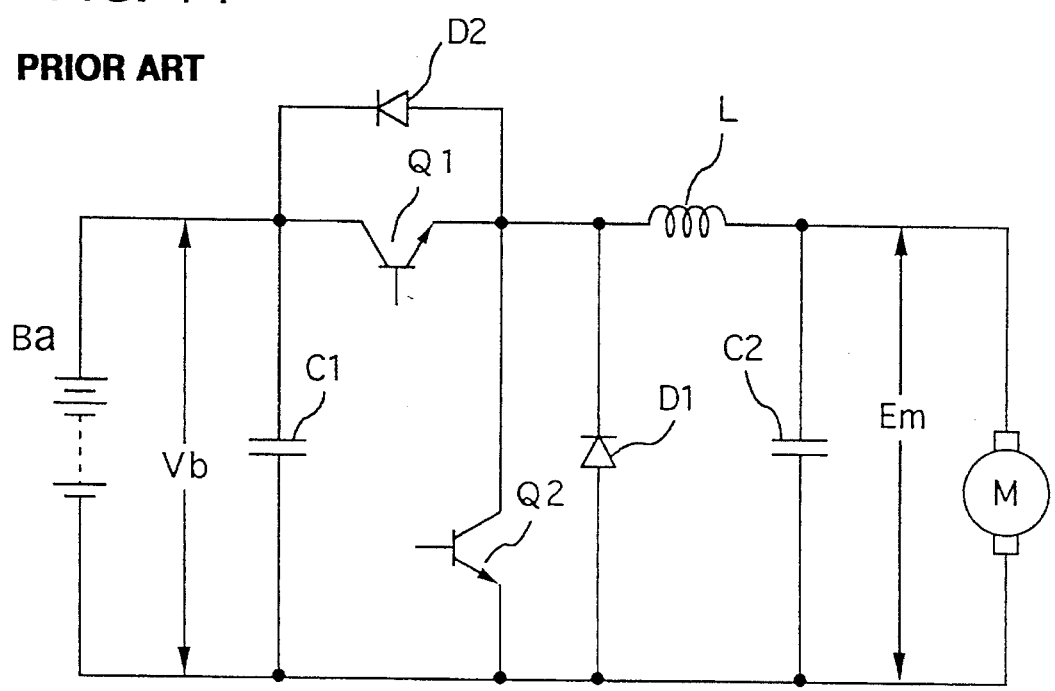
FIG. 11 is a circuit diagram of one conventional apparatus for an electric vehicle.
Figure 12:
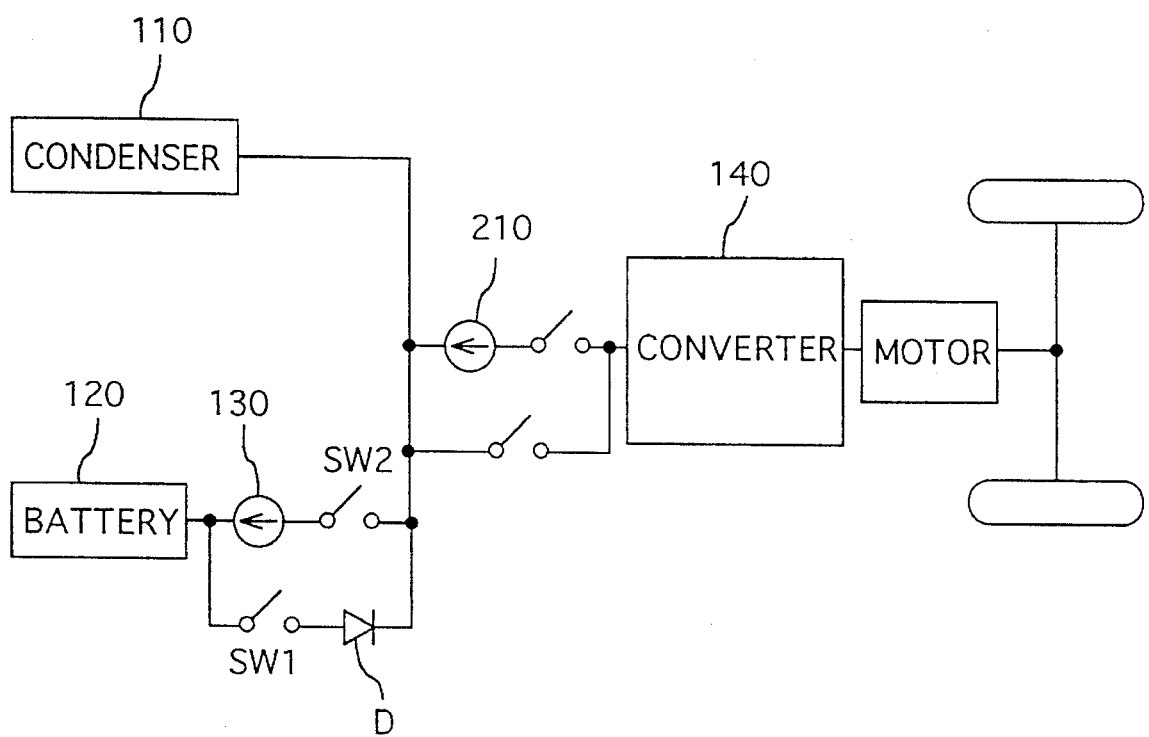
FIG. 12 is a schematic view of another conventional apparatus.

FIG. 10 illustrates the apparatus of the seventh embodiment. In the present embodiment, a three phase A.C. motor is used in place of the D.C. motor 8B of the fifth and sixth embodiments. An induction motor 29B is used as the three phase A.C. motor, and an inverter BOB is used as the motor control means. The motor control computer 13B performs the vector control of the intensity, frequency and phase of the current flowing in the induction motor 29B to control the number of revolutions and torque of the induction motor 29B. The remaining constitutions and operations of the seventh embodiment are identical to those of the fifth or sixth embodiment.

In the conventional electric vehicles, when a battery current instantaneously rises upon acceleration thereof, the output voltage of the battery remarkably drops. Normally, the battery is used with an output voltage greater than a predetermined discharge stop voltage. When an accelerator pedal is operated to accelerate the vehicle rapidly, there is a possibility that a large current instantaneously flows and the output voltage instantaneously drops below the discharge stop voltage to stop discharging although a sufficient amount of electric energy remains. However, with the fifth, sixth and seventh embodiments, since the motor is operated by the discharging from the capacitor of a large capacitance, the electric current from the battery is always constant even when a large electric current is instantaneously fed to the motor. Therefore, the output voltage of the battery is prevented from dropping below the discharge stop voltage to stop discharging although a sufficient amount of electric energy remains in the battery.

Figure 20:
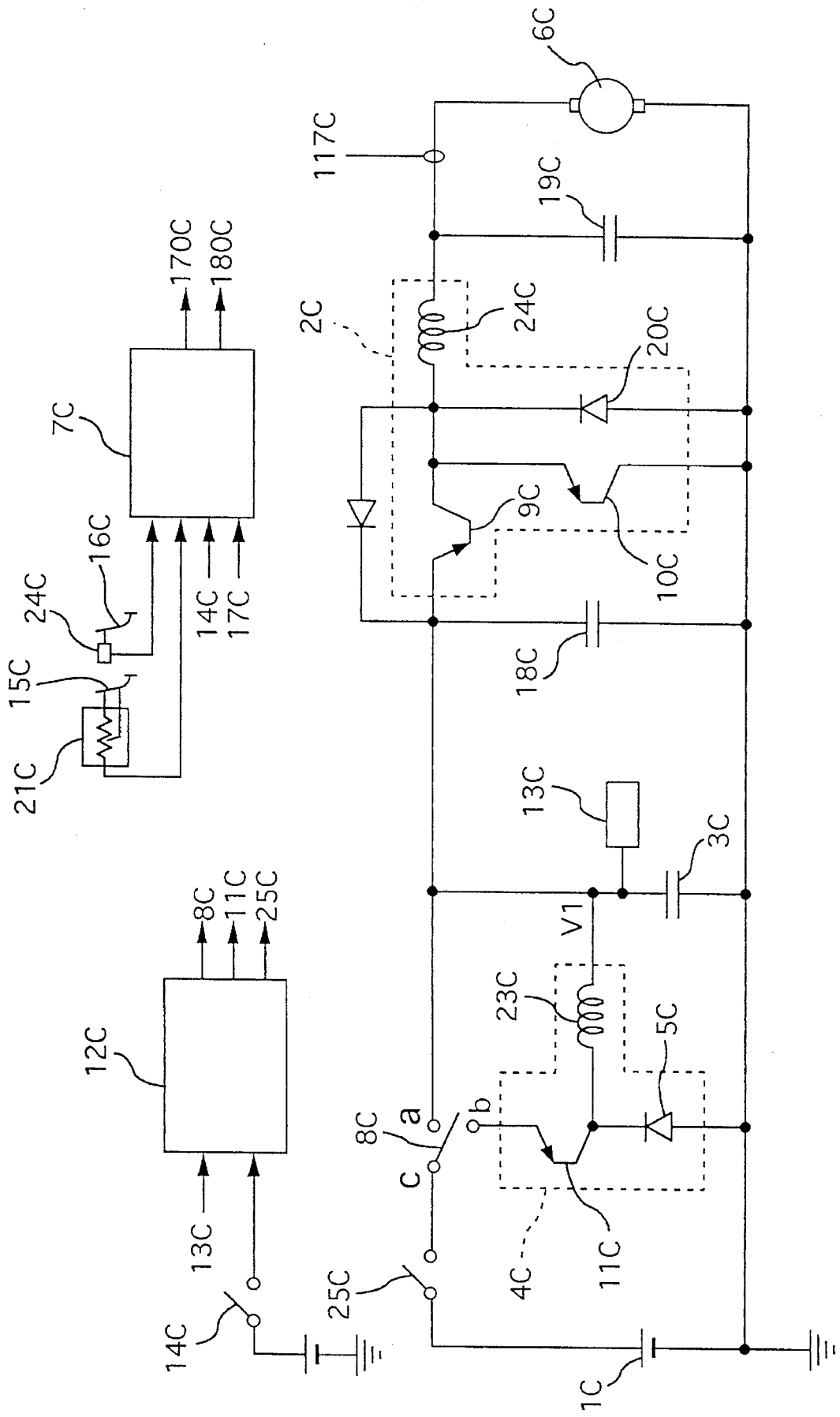
FIG. 20 is a circuit diagram according to an eighth embodiment of the present invention.

A circuit diagram of the apparatus of the eighth embodiment is illustrated in FIG. 20. The apparatus includes current limit means for limiting the current flowing into a capacitor 3C of a large capacitance from a battery 1C. The current limit means is composed of a first chopper 4C having a charge control switch 11C, reactance element 23C and diode 5C. One end of the charge control switch 11C, one end of the reactance element 23C and an anode of the diode 5C are connected at one point, and the capacitor 3C (30F) of which the withstand voltage (480 V) is two times of that of the battery 1C is interposed between the other end of the reactance element 23C and a minus terminal of the battery 1C (240 V).

The apparatus further includes a change over switch 8C as the change-over means for changing over the connection of point "c" at the plus terminal of the battery 1C from point "a" on the cathode side of the diode 5C to point "b" at the other end of the switch 11C and vice versa, and a power supply switch 25C as a main power supply of an electric vehicle. In the present embodiment, a second chopper 2C composed of motor drive switch 170C, motor brake switch 180C, diode 20C and coil 24C as the motor control means. One end of the motor drive switch 170C, one end of the motor brake switch 180C, one end of the coil 24C, and an anode of the diode 20C are connected at one point, and the other end of the motor drive switch 170C is connected to the anode of the diode 20C. The cathode of the diode 20C is connected to a minus terminal of the battery 1C. A D.C. motor 6C as a motor for an electric vehicle is interposed between the other end of the coil 24C and the cathode of the diode 20C. Furthermore, high frequency wave block capacitors 18C and 19C (10 mF) are respectively interposed between the second chopper 2C and the capacitor 3C and between the second chopper 2C and the D.C. motor 6C in parallel to the battery 1C.

In operation, when the power supply switch 25C is turned on, the charge control switch 11C of the first chopper 4C is turned on and off intermittently to charge the capacitor 3C. One end of the second chopper 2C is connected to the D.C. motor 6C, whereby the motor 6C is driven or braked by the command of a motor control computer 7C. The high frequency wave block capacitors 18C and 19C smooth the high frequency wave of 10 Hz to 10 kHz.

The control of the D.C. motor 6C by the motor control computer 7C will be explained. The apparatus includes a current sensor 17C which detects the current flowing into the second chopper 2C. The detection signals from the current sensor 17C are input to the motor control computer 7C. The current sensor 17C detects the magnetic field generated due to the flowing current, and calculates the current intensity based on the detected magnetic field. The motor control computer 7C controls the on, off ratio of the motor drive switch 170C and the motor brake switch 180C of the second chopper 2C in accordance with the detection signals from the current sensor 17C, and controls driving and regenerative braking of the D.C. motor 6C.

Figure 6:
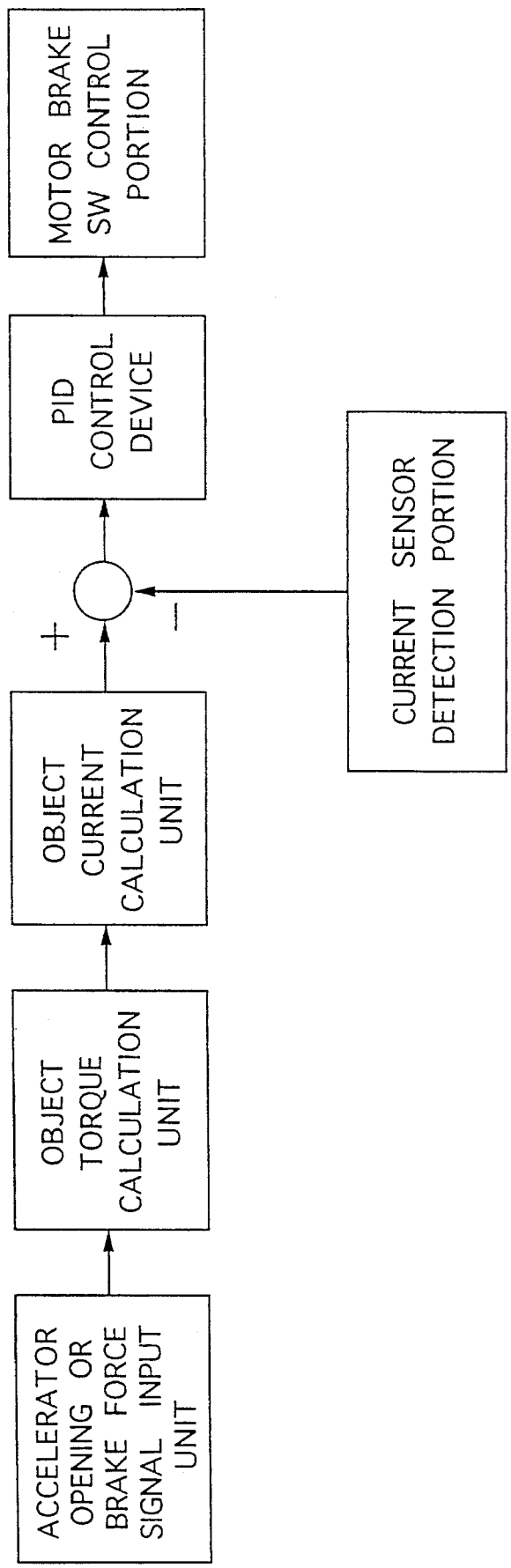
FIG. 6 is a block diagram showing the control of a DC motor according to the fifth embodiment of the present invention.

The operation of the motor control computer 7C will be explained with reference to FIG. 6. When a start switch 14C of an electric vehicle is turned on, the process of the motor control computer 7C starts. When an accelerator pedal 15C or brake pedal 16C is operated, the opening of the accelerator pedal 15C is detected by an opening sensor 21C, or the force applied to the brake pedal 16C is detected by a pressure sensor 24C, and the detection signal is input to an accelerator opening or brake force signal input unit. In the present embodiment, the pressure sensor 24C uses strain gauges.

The object torque T corresponding to the opening of the accelerator pedal 15C or the force applied to the brake pedal 16C, and the object current I corresponding to the object torque T are calculated in an object torque operation unit and an object current operation unit by using the following equations;

Object torque in the case that the accelerator pedal 15C is operated: $T=k1 \times x$ (Nm)

Object torque in the case that the brake pedal 16C is operated: $T=k2 \times Tb$ (Nm)

Object current corresponding to the object torque T: $I=k3 \times T$ (A)

where x is the opening of the accelerator pedal 15C, Tb is the force applied to the brake pedal 16C, and k1, k2 and k3 are constants.

The electric current detected by the current sensor 17C is fed back to a PID control device to control the operation of the motor drive switch 170C and the motor brake switch 180C so that the current io detected by the current sensor 17C approximates the object current I.

Figure 21:
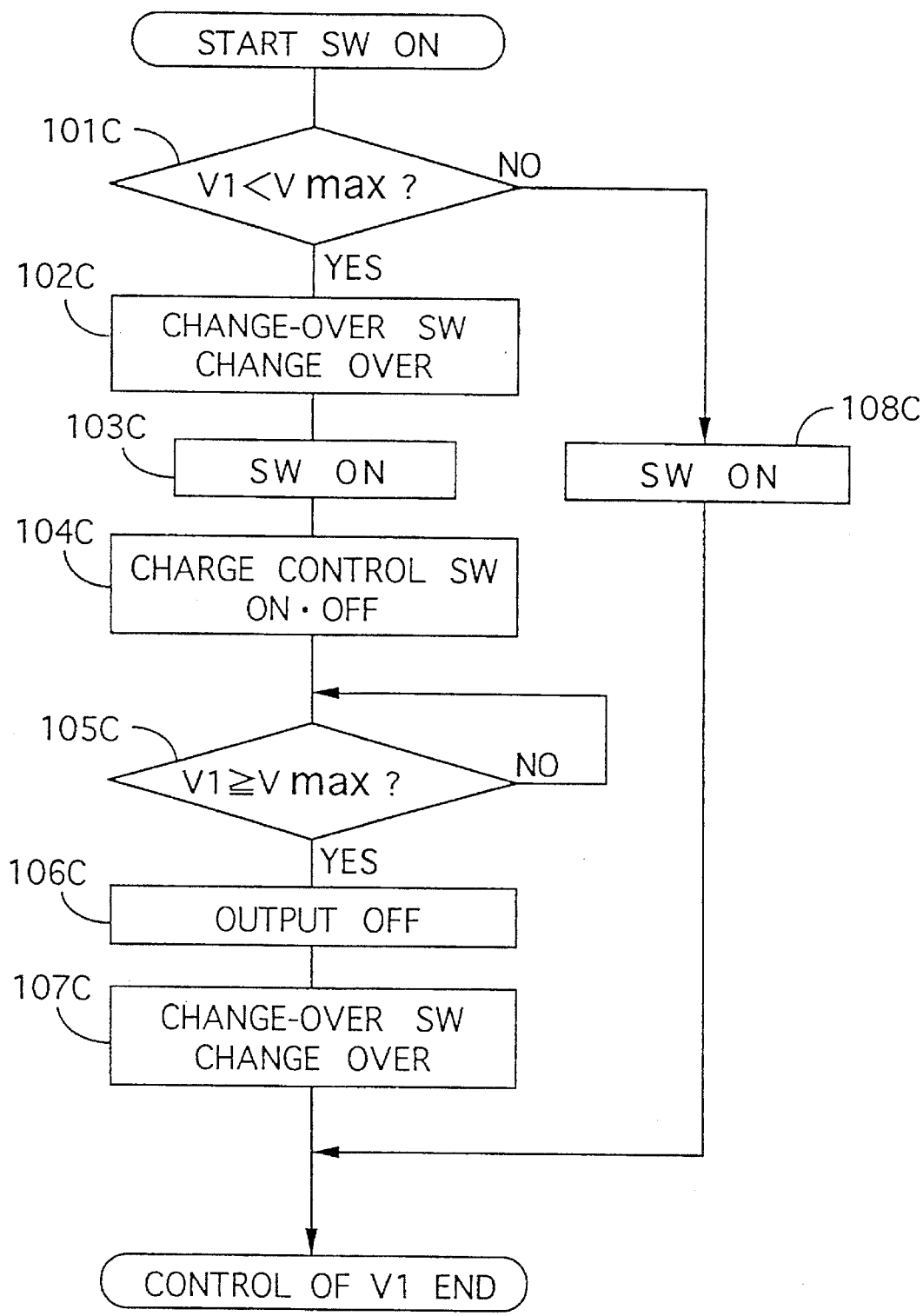
FIG. 21 is a flow chart showing the process of a voltage control computer in the eighth embodiment of the present invention.

When a leakage current flows from the capacitor 3C and the potential of the capacitor 3C drops during stopping over a long period of time, the discharge control of the capacitor 3C is carried out as follows. When the start switch 14C is closed, the process of a voltage control computer 12C starts to change-over the change over switch 8C upon receiving detection signals from a voltage sensor 13C which detects the voltage V1 of the capacitor 3C, and to control on and off of the charge control switch 11C of the first chopper 4C when the switch 25C is turned on. When the charge control switch 11C is on and off, the charge control of the voltage V1 of the capacitor 3C is carried out as follows; The pressure sensor 13C detects the voltage V1 of the capacitor 3C, and detection signals of the voltage sensor 13C are input to the voltage control computer 12C. The voltage control computer 12C charges the capacitor 3C, as shown in the flow chart of FIG. 21.

At step 101C, a decision is made whether or not the detected voltage V1 of the capacitor 3C is more than the reference voltage Vmax. If the voltage V1 is more than the reference voltage Vmax, at Step 102C, the change-over switch 8C is changed over to connect point "c" to point "b". At Step 103C, the switch 25C is turned on to supply power to the electric vehicle. At Step 104C, the charge control switch 11C is turned on and off intermittently to charge the capacitor 3C. At Step 105C, a decision is made whether or not the voltage V1 of the capacitor 3C is not less than the reference voltage Vmax. If the voltage V1 is not less than the reference voltage Vmax, at Step 106C, output of the charge control switch 11C is stopped. At Step 107C, the change-over switch 8C is changed over to connect point "c" to point "a" to finish the control of the voltage V1 of the capacitor 3C. If the voltage V1 is less than the reference voltage Vmax at Step 105C, returning to Step 104C, the charge control switch 11C is turned on and off intermittently until the voltage V1 rises above the reference voltage Vmax. If the voltage V1 is greater than the reference voltage Vmax at Step 101C, at Step 108C, the power supply switch 25C is turned on to finish the control of the voltage V1. As described above, the voltage of the capacitor 3C is controlled in response to the starting of the electric vehicle. In the present embodiment, the chopper is used as the current limit means. This enables the capacitor 3C to be rapidly charged.

Figure 22:
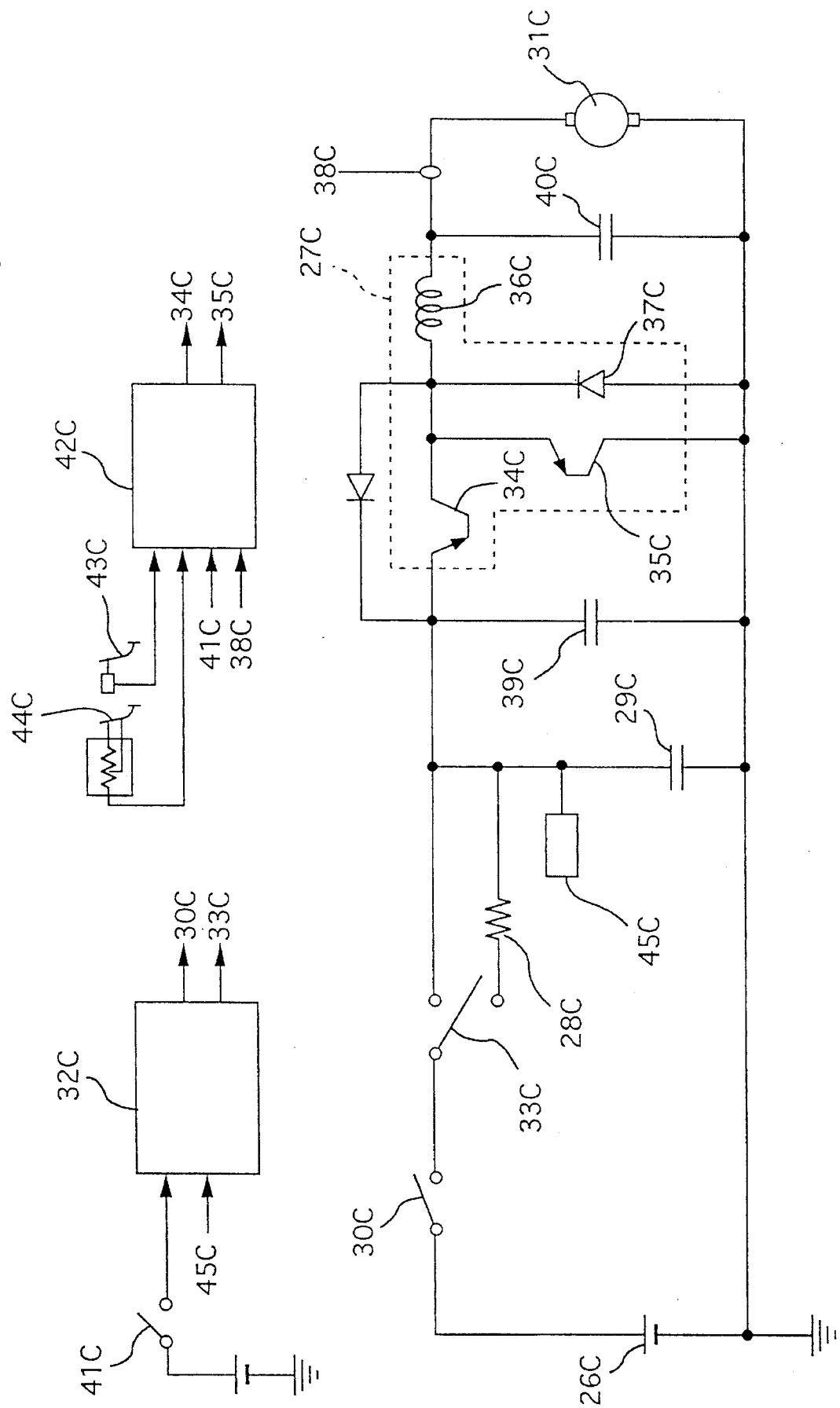
FIG. 22 is a circuit diagram in accordance with a ninth embodiment of the present invention.

A ninth embodiment of the present invention is illustrated in FIG. 22. As shown, a capacitor 29C of a large capacitance (30F) of which the withstand voltage (480 V) is two times of that of the battery 1C and a resistor 28C (3Ω) are interposed between a battery 26C (240 V) and a second chopper 27C composed of a motor drive switch 34C, motor brake switch 35C, reactance element 36C and diode 37C. A change-over switch 33C is provided to connect the battery 26C to the resistor 28C or the motor drive switch 34C. The capacitor 29C is charged via the resistor 28C just before running of the vehicle. The second chopper 27C is connected to a D.C. motor 31C as the motor for an electric vehicle. The motor 31C is driven and braked by the command of a motor control computer 42C. In the present embodiment, high frequency wave block capacitors 39C and 40C (10 mF) are respectively provided between the second chopper 27C and the capacitor 29C and between the second chopper 27C and the motor 31C to smooth the high frequency wave of 10 kHz to 10 Hz.

In operation, a current sensor 38C detects the electric current flowing into the motor 31C and detection signals from the current sensor 38C are input to the motor control computer 42C. The motor control computer 42C controls the on-off ratio of the motor drive switch 34C and the motor brake switch 35C of the second chopper 2C based on the detection signals from the current sensor 38C to control driving and regenerative braking of the D.C. motor 31C. The control of the D.C. motor 31C by the motor control computer 42C is carried out in accordance with the opening of an accelerator pedal 44C and the force applied to a brake pedal 43C. The control method of the motor 31C is identical to that of the eighth embodiment which is carried out by the motor control computer 7C. Therefore, descriptions thereof will be omitted.

When a leakage current flows from the capacitor 29C and the potential thereof drops during stopping of an electric vehicle over a long period, the capacitor 29C is charged by the operation of a voltage control computer 32C. When a start switch 41C is turned on, and a voltage sensor 45C detects that the potential of the capacitor 29C is less than the reference potential, the change-over switch 33C which has connected the plus terminal of the battery 26C to the motor drive switch 34C of the second chopper 27C connects the plus terminal of the battery 26C to the resistor 28C to charge the capacitor 29C when the switch 30C is turned on. When charging of the capacitor 29C is completed, the change-over switch 33C is changed over to connect the plus terminal of the battery 26C to the motor drive switch 34C again to supply power to the motor 31C for electric vehicle.

Figure 23:
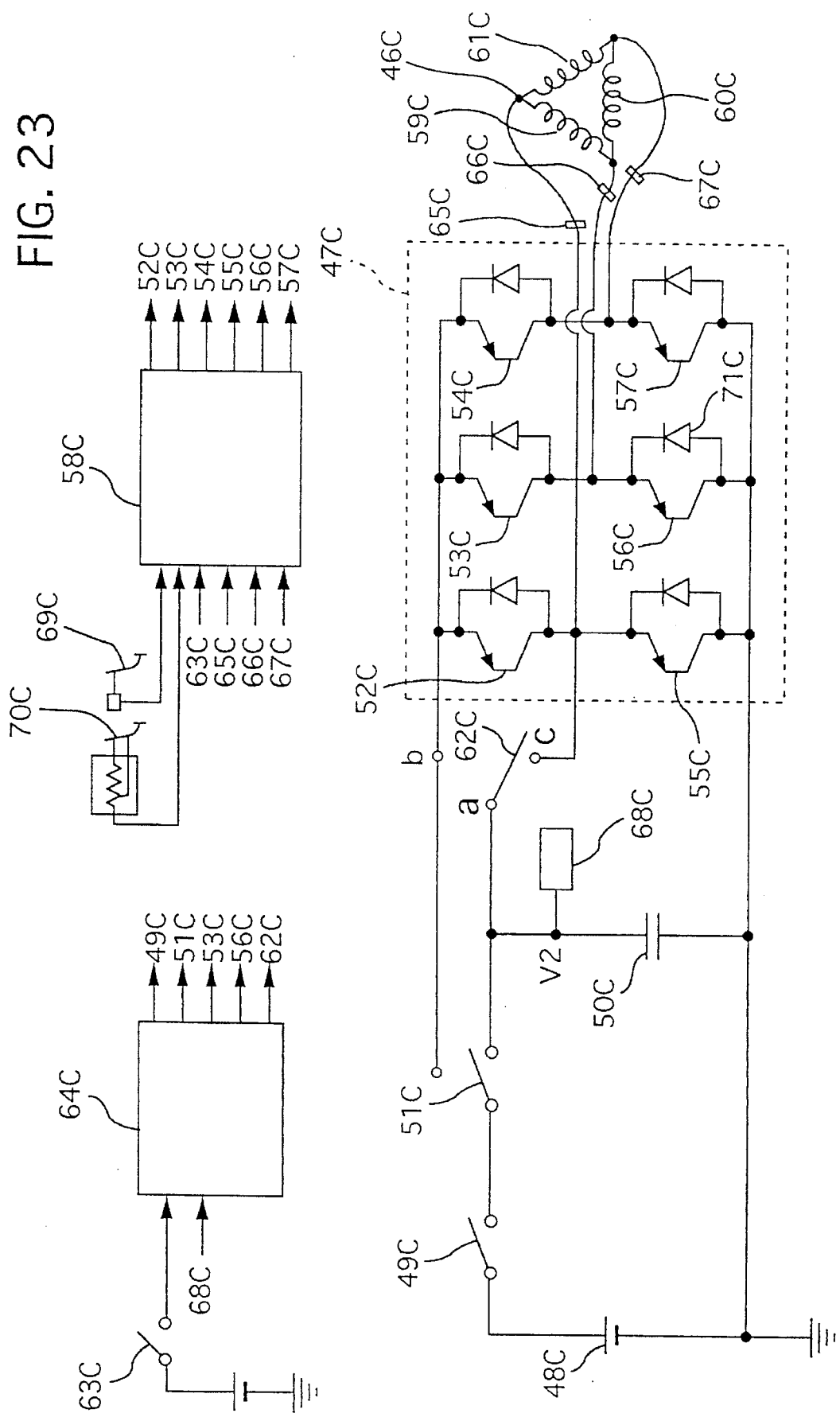
FIG. 23 is a circuit diagram according to a tenth embodiment of the present invention.

A tenth embodiment of the present invention is illustrated in FIG. 23. As shown, a three phase A.C. motor 46C is used as the motor for electric vehicle, and an invertor 47C is used as the motor control means. A switch 49C as the power supply for the electric vehicle and a change-over switch 51C as the change-over means for charging a capacitor 50C of a large capacitance are interposed between a plus terminal of a battery 48C (240 V) and the capacitor 50C. A change-over switch 62C is provided to connect point "a" between the capacitor 50C and the plus terminal of the battery 48C to points "b" or "c" of the invertor 47C. When charging of the capacitor 50C is controlled, semiconductor switches 52C to 57C which control power to be supplied to the three phase A.C. motor 46C are used. Coils 59C, 60C and 61C of the motor 46C are used as the current limit means. A motor control computer 58C carries out the vector control of the intensity, frequency and phase of the electric current flowing into the three phase A.C. motor 46C by controlling on and off states of the semiconductor switches 52C to 57C to control the number of revolutions and torque of the motor 46C. The above vector control is carried out in accordance with the opening of the accelerator pedal 70C and the force applied to the brake pedal 69C, which are input to the motor control computer 58C, and the electric current flowing into the motor 46C, which is detected by the current sensors 65C, 66C and 67C.

Figure 24:
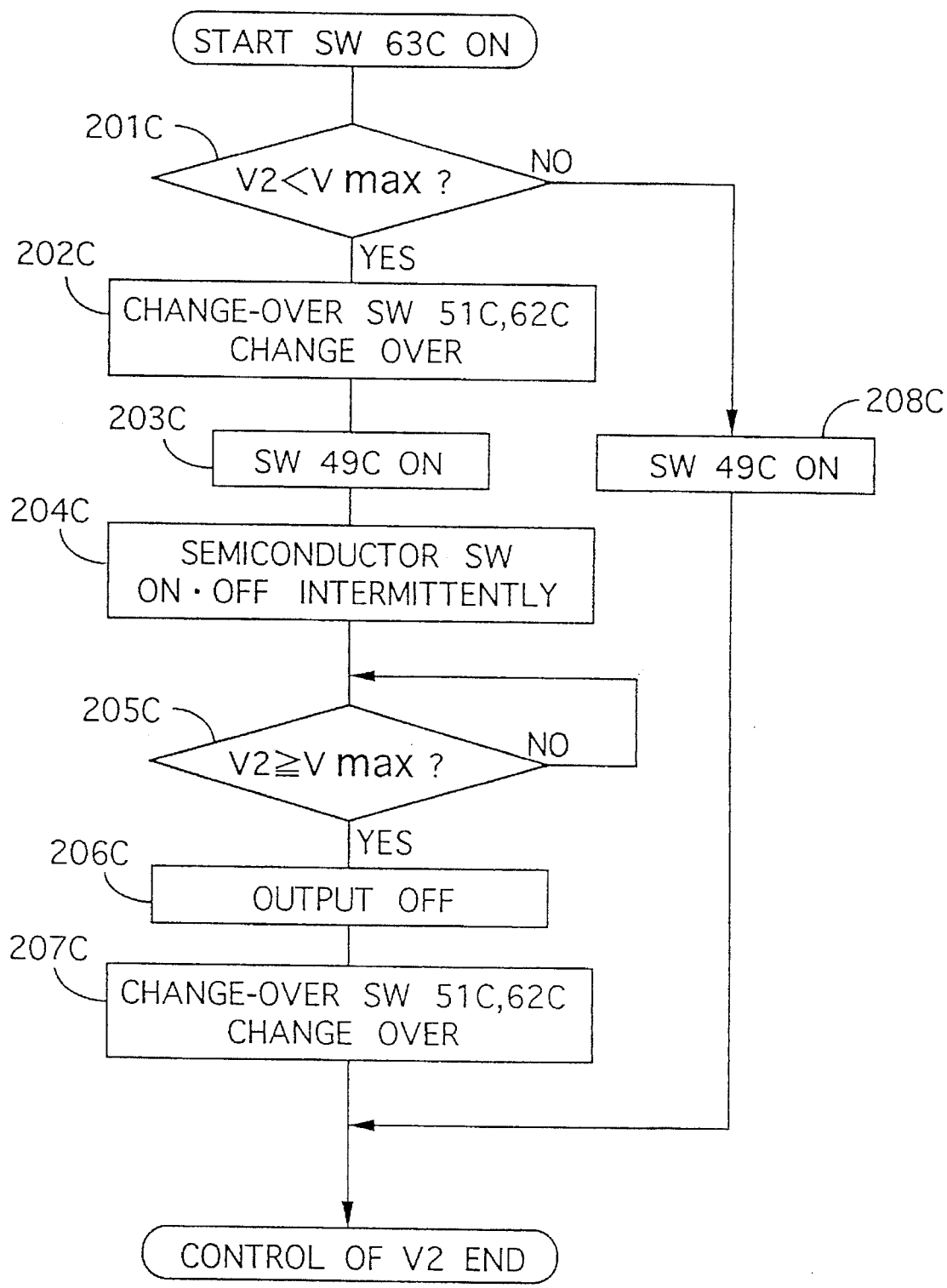
FIG. 24 is a flow chart showing the process of a voltage control computer in the tenth embodiment of the present invention.

In operation, during stopping of an electric vehicle over a long period, there is a possibility that a leakage current flows from the capacitor 50C and the potential of the capacitor 50C drops. When a start switch 63C of the electric vehicle is turned on, a voltage control computer 64C operates to carry out the control shown in the flow chart of FIG. 24, whereby the operations of the change-over switches 51C and 62C, and the semiconductor switches 53C and 56C are controlled. At Step 201C, a decision is made whether or not the voltage V2 of the capacitor 50C which is detected by a voltage sensor 68C is more than the reference voltage Vmax. If the voltage V2 is more than the reference voltage Vmax, at Step 202C, the change-over switch 51C which has connected the plus terminal of the battery 48C to one end of the capacitor 50C during stopping is changed over to connect the plus terminal of the battery 48C to point "b" of the invertor 47C. At the same time, the change-over switch 62C which has connected point "a" to point "b" during stopping is changed over to connect point "a" to point "c". At Step 203C, the switch 49C is turned on, and at Step 204C, the semiconductor switch 53C is turned on and off intermittently while the semiconductor switch 56C is in the off state to charge the capacitor 50C. When the semiconductor switch 53C is on, the capacitor 50C is charged via two power supply paths; that is via the coil 59C and via the coils 60C and 61C. When the semiconductor switch 53C is off, the capacitor 50C is charged by virtue of a diode 71C. When the electric vehicle is changed over from the running state to the stopping state, the motor 46C stops and at the same time the semiconductor switches 52C to 57C are all turned off, and accordingly, at Step 204C, there is a possibility that only the semiconductor switch 53C is on. At Step 205C, a decision is made whether or not the voltage V2 of the capacitor 50C is not less than the reference voltage Vmax. If the voltage V2 is not less than the reference voltage Vmax, at Step 206C, the on-off output of each of the semiconductor switches 52C to 57C are stopped to complete charging of the capacitor 50C. At Step 207C, the change-over switch 51C is changed over to connect the plus terminal of the battery 48C to point "a", and the change-over switch 62C is changed over to connect point "a" to point "b". At step 201C, if the voltage V2 of the capacitor 50C is more than the reference voltage Vmax, At Step 208C, the switch 49C is turned on to finish the control of the voltage V2.

Figure 25:
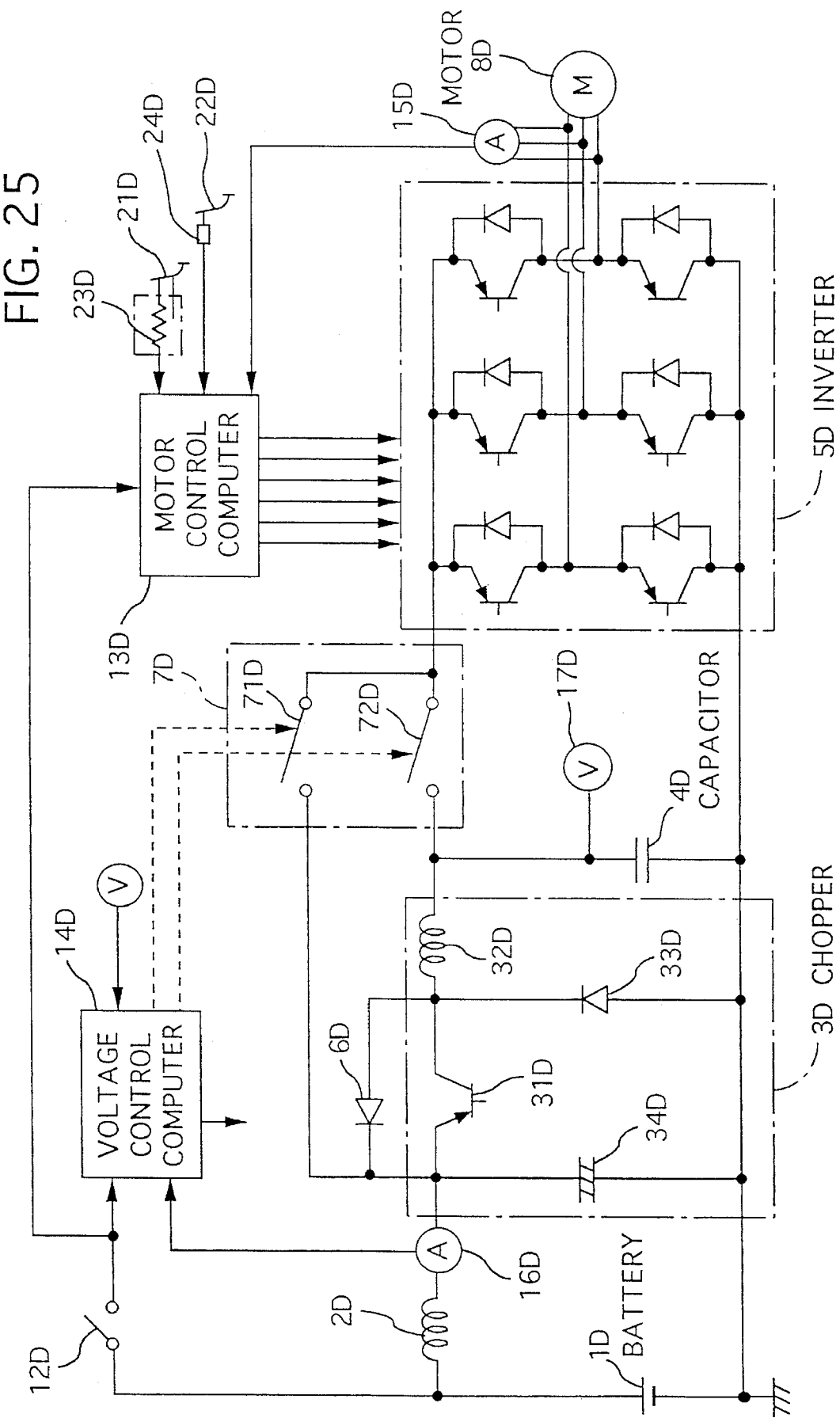
FIG. 25 is a circuit diagram of an eleventh embodiment of an apparatus in accordance with the present invention.

An eleventh embodiment of the present invention is illustrated in FIG. 25. As shown, a plus terminal of a battery 1D (240 V ex.) is connected to an input end of a transistor 31D of a chopper 3D via a coil 2D and a current sensor 16D. A minus terminal is grounded.

In the chopper 3D, one end of a coil 32D (1 m Ω ex.) is connected to an output end of the transistor 31D to smooth an intermittent current from the transistor 31D. And output signals from a voltage control computer 14D are fed to the transistor 31D as a base current. One end of a high frequency wave block electrolytic capacitor 34D (5 mF ex.) is connected to an input end of the transistor 31D while the other end thereof is grounded. A cathode of a free wheel diode 33D is connected to a connection point of the transistor 31D and the coil 32D while an anode thereof is grounded.

A capacitor 4D of a large capacitance is connected between the other end of the coil 32D and a minus terminal of the battery 1D in parallel to the output side of the chopper 3D. The voltage of the capacitor 4D is detected by a voltage sensor 17D, and detection signals are fed to a voltage control computer 14D. Furthermore, a diode 6D is provided in parallel to the transistor 31D of the chopper 3D such that the anode of the diode 6D is connected to the output side of the transistor 31D and a cathode thereof is connected to the input side of the transistor 31D. The capacitor of a large capacitance means a capacitor of which the capacitance is 0.1 F or more. The preferable capacitance is 10 F to 50 F. And in the present embodiment, an electric double layered capacitor of 30 F is used as the capacitor 4D. In place of the electric double layered capacitor 4D, a plurality of capacitors may be used such that they are connected in parallel to obtain a capacitance identical to that of a single capacitor of a large capacitance.

The output side of the chopper 3D and the capacitor 4D are both connected to an invertor 5D as the motor control means through switch means 7D. The invertor 5D includes six transistors which are connected by a three phase rectifier bridge, and six free wheel diodes which are respectively connected to the transistors in parallel. The invertor 5D is connected to a motor control computer 13D such that pulse signals are fed to a base of each of the transistors. An induction motor 8D as a three phase A.C. motor (hereinafter will be called merely a motor 8D) is connected to three phase output terminals of the invertor 5D.

The motor control computer 13D is constituted so as to control the number of revolutions of the motor 8D and the torque thereof by the vector control of the intensity, frequency and phase of the current fed to the motor 8D, which are detected by a current sensor 15D. The transistors of the invertor 5D are turned on and off with a phase of 120° in accordance with the pulse signals from the motor control computer 13D, and output voltage, that is three phase A.C. voltage, is applied to the motor 8D. At this time, the frequency is set in response to that of the pulse signals from the motor control computer 13D, and the applied voltage is set in response to the on- off duty ratio of the transistor 31D of the chopper 3D. The motor 8D is coupled with wheels of an electric vehicle, whereby the speed of the electric vehicle is adjusted by the control of the invertor 5D.

In the present embodiment, the motor 8D acts as a generator during braking of the electric vehicle to carry out regenerative braking and to charge the battery. Namely, during braking, an electric current is fed from the motor 8D to the battery via the free wheel diodes of the invertor 5D to first charge the capacitor 4D via the free wheel diodes of the invertor 5D. After the capacitor 4D is sufficiently charged, the battery 1D is charged via the diode 6D.

The motor control computer 13D and the voltage control computer 14D are both connected to the battery 1D via a start switch 12D. The motor control computer 13D is connected such that detection signals from an opening sensor 23D which detects the opening of an accelerator pedal 21D and those from a strain gauge pressure sensor 24D which detects the force applied to a brake pedal 22D are input to the motor control computer 13D as well as detection signals from a current sensor 15D which measures the electric current fed to the motor 8D from the invertor 5D. The voltage control computer 14D is connected such that detection signals from a current sensor 16D which detects the electric current fed to the chopper 3D from the battery 1D via a coil 2D and those from the pressure sensor 17D are input to the voltage control computer 14D.

The switch means 7D acts as change-over means of the present invention and includes a pair of switches 71D and 72D which respectively compose first and second switch means. One of fixed contacts of each switch 71D or 72D is connected to an input end of the invertor 5D. The other fixed contact of the switch 71D is connected to an input end of the chopper 3D, and is connected to a plus terminal of the battery 1D via the current sensor 16D and the coil 2D, namely connected to a connection point of the input end of the chopper 3D and the battery 1D. The other fixed contact of the switch 72D is connected to a connection point of the output side of the chopper 3D and the capacitor 4D. Movable contacts of the switches 71D and 72D are respectively connected to the voltage control computer 14D to set following three change over positions in accordance with the running state of electric vehicle.

Namely, at a first change-over position, the switch 71D is off ( open ) while the switch 72D is on (closed) to compose a first parallel connection circuit of the capacitor 4D and the chopper 3D, at a second change-over position, the switch 71D is on while the switch 72D is on to compose a second parallel connection circuit of the battery 1D and the capacitor 4D, and at a third change-over position, the switch 71D is on while the switch 72D is off to directly connect the battery 1D to the motor 8D via the invertor 5D.

The first change-over position is set in the normal running mode, the second change-over position is set in the power mode or during continuously running on an uphill, and the third change over position is set to compensate the transition state from the first change-over position to the second change over position. During charging of the capacitor 4D such that the output voltage thereof is greater than the reference voltage, only the battery 1D acts as a power supply for driving an electric vehicle.

In the present embodiment, change-over of the switches 71D and 72D is controlled by the motor control computer 14D. Instead, the above change-over may be controlled by manual operations. In FIG. 25, these switches 71D and 72D are shown as mechanically switching mechanisms. Instead, they can be composed of switching transistors or the like.

In operation, when the start switch 12D of an electric vehicle is turned on, the motor control computer 13D and the voltage control computer 14D start to drive the switch means 7D. When the switch means 7D is at the first change-over position, namely in the normal running mode, an output current from the battery 1D charges the capacitor 4D via the chopper 3D. And power is supplied to the motor 8D via the invertor 5D, thereby driving the motor 8D by the control of the invertor 5D. During regenerative braking of the motor 8D, a regenerative current is charged in the capacitor 4D via the free wheel diodes of the invertor 5D. When the regenerative current exceeds the capacitance of the capacitor 4D, an excessive current is fed back via the diode 6D to the battery 1D and is collected thereby.

At this time, the transistor 31D of the chopper 3D is driven on and off in accordance with output signals from the voltage control computer 14D, such as at a frequency of 500 Hz. This causes voltage of intermittent waveforms to be output at the output end of the transistors 31D. This voltage is smoothed by the coil 32D and the free wheel diode 33D to be supplied to the invertor 5D as a D.C. voltage of a small ripple component. In addition, the ripple added to the output of the battery 1D due to the on and off of the chopper 3D is reduced by the coil 2D.

The D.C. voltage output from the chopper 3D is controlled in accordance with the on-off duty ratio of the output signal from the voltage control computer 14D. The voltage control computer 14D includes a pulse width modulation control unit (not shown) which calculates the on-off duty ratio based on the detection signals from the current sensor 16D and the voltage sensor 17D, namely, the electric current at the input end of the chopper 3D and the voltage at the output end of the chopper 3D for controlling the output signals of the chopper 3D to a predetermined voltage. Thus, the voltage to be applied to the motor 8D via the invertor 5D is controlled to a predetermined voltage by the voltage control computer 14D.

When an accelerator pedal 21D or brake pedal 22D is operated, the opening of the accelerator pedal 21D is detected by an opening sensor 23D, or the force applied to the brake pedal 22D is detected by a pressure sensor 24D, and detection signals are input to the motor control computer 13D.

The object torque T corresponding to the opening of the accelerator pedal 21D or the force applied to the brake pedal 22D, and the object current I corresponding to the object torque T are calculated by using the following equations:

Object torque in the case that the accelerator pedal 21D is operated: $T = k_1 \times x$ (Nm)

Object torque in the case that the brake pedal 22D is operated: $T = k_2 \times T_b$ (Nm)

Object current corresponding to the object torque T: $I = k_3 \times T$ (A)

where x is the opening of the accelerator pedal 21D, Tb is the force applied to the brake pedal 22D, and k1, k2 and k3 are constants.

The invertor 5D is controlled by the motor control computer 13D such that the actual electric current detected by the current sensor 15D approximates the above-described object current I.

When the motor 8D is stopped, the battery 1D charges the capacitor 4D. When an electric vehicle stops and the start switch 12D is turned off, the operation of the chopper 3D stops so as to stop charging the capacitor 4D from the battery 1D. With this arrangement, the dischargeable capacitance of the battery 1D is increased, and charging of the battery is also carried out to enable the running over a longer distance.

Figure 27:
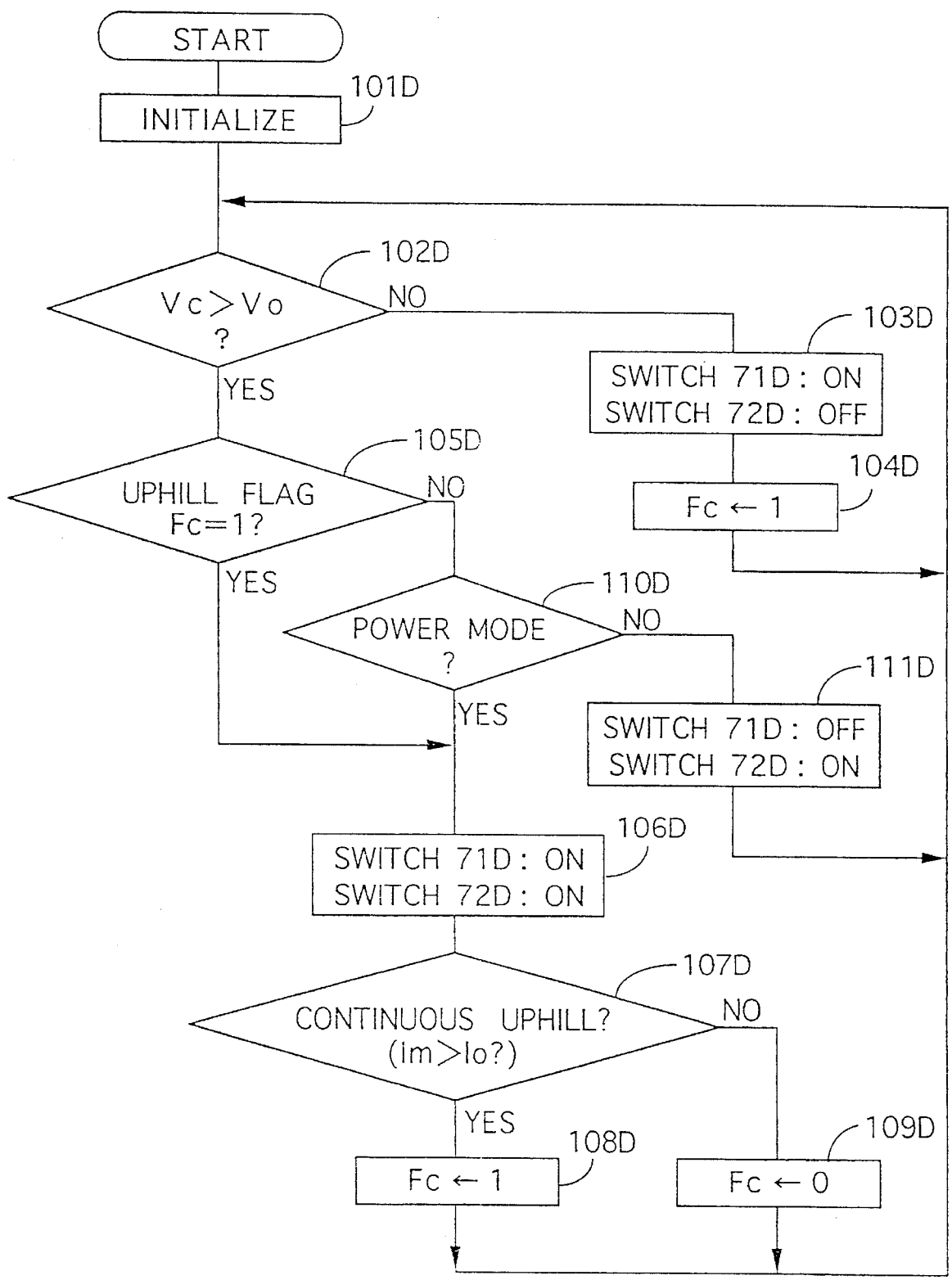
FIG. 27 is a flow chart showing the process of a voltage control computer in the eleventh and twelfth embodiments of the present invention.

FIG. 27 shows the process of the voltage control computer 14D which operates to drive the switch means 7D in accordance with the running state of an electric vehicle. Hereinafter, the operation of the switch means 7D will be explained with reference to FIG. 27. At Step 101D, the start switch 12D is turned on to initialize the process. This causes the switches 71D and 72D to be both turned off and a later-described uphill flag Fc is reset (0).

Next, at Step 102D, the voltage Vc of the capacitor 4D is compared with a predetermined reference voltage Vo (½ of the rated voltage of the battery 1D, for example). If the voltage Vc is less than the reference voltage Vo, at Step 103D, the switch 71D is turned on and the switch 72D is turned off. Namely, the switch means 7D is at the third change-over position. This causes an electric current to be supplied from the battery 1D directly to the invertor 5D (via the coil 2D and the current sensor 16D), and the motor 8D is driven only by the output from the battery 1D. In addition, the transistor 31D of the chopper 3D is turned on to supply a charge current to the capacitor 4D from the battery 1D. Then, at Step 104D, the uphill flag Fc is set and the process is returned to Step 102D. At this step, the voltage Vc is again compared with the reference voltage Vo.

When the capacitor 4D is charged and the voltage thereof is greater than the reference voltage Vo, at Step 105D, the state of the uphill flag Fc is decided. Just after the start switch 12D is turned on, the uphill flag Fc is set at Step 104D. In this case, at Step 106D, both the switch 71D and switch 72D are turned on, and the switch means 7D is changed to the second change-over position. This results in the parallel circuit composed of the battery 1D and the capacitor 4D being connected to the invertor 5D.

The second change-over position corresponds to the running mode in the case of an electric vehicle continuously running on uphills. At Step 107D, a decision is made whether or not the electric vehicle is continuously running on uphills. For example, when the average current Im of an output current from the battery 1D in a predetermined period (5 minutes, for example) which is obtained based on the detection signals from the current sensor 16D exceeds a predetermined current Io, it is decided as the continuous uphill state. At Step 108D, the uphill flag Fc is set (1), and the process returns to Step 102D. The above operations are repeated. In contrast, when the average current Im is less than the predetermined current Io so as to be decided as non continuous uphill state at Step 107D, the uphill flag Fc is reset at Step 109D, and the process returns to Step 102D.

When it is decided that the uphill flag Fc is not set at Step 105D, at Step 110D, a decision is made whether the mode is power mode or not. If power mode, the switch means 7D is changed to the second change-over position at Step 6D, thereafter the above operations are repeated. If it is decided as the normal running mode at Step 110D, at Step 111D, the switch 71D is turned off while the switch 72D is turned on, whereby the switch means 7D is changed to the first change-over position, and the process returns to Step 102D. This causes the parallel circuit composed of the chopper 3D and the capacitor 4D to be connected to the invertor 5D. whereby both the operations of the parallel circuit and the invertor 5D are combined together to keep the consumption current of the battery 1D to a minimum.

When the switch means 7D is changed over from the normal running mode (the first change-over position at which the chopper 3D and the capacitor 4D are connected in parallel) to the power mode, and at Step 102D, the voltage Vc of the capacitor 4D is decided less than the reference voltage Vo, the switch means 7D is changed over to the third change-over position at Step 103D to charge the capacitor 4D. Then, the switch means 7D is changed over to the second change-over position. In the case that the voltage Vc of the capacitor 4D is decided greater than the reference voltage Vo, the process proceeds to Steps 105D, 110D and 106D and changed over to the second change-over position to connect the battery 1D and the capacitor 4D in parallel.

This causes the travelable distance on one charge of battery 1D to be increased by 50 to 100% at the first change-over position in the normal running mode, and to be increased by 5 to 20% at the second change over position in the power mode or in the continuous running mode on uphills, as compared with that of the conventional electric vehicle, although that at the third change-over position is nearly equal to that of the conventional electric vehicle. Thus, with the present embodiment, the travelable distance is greatly increased.

Figure 26:
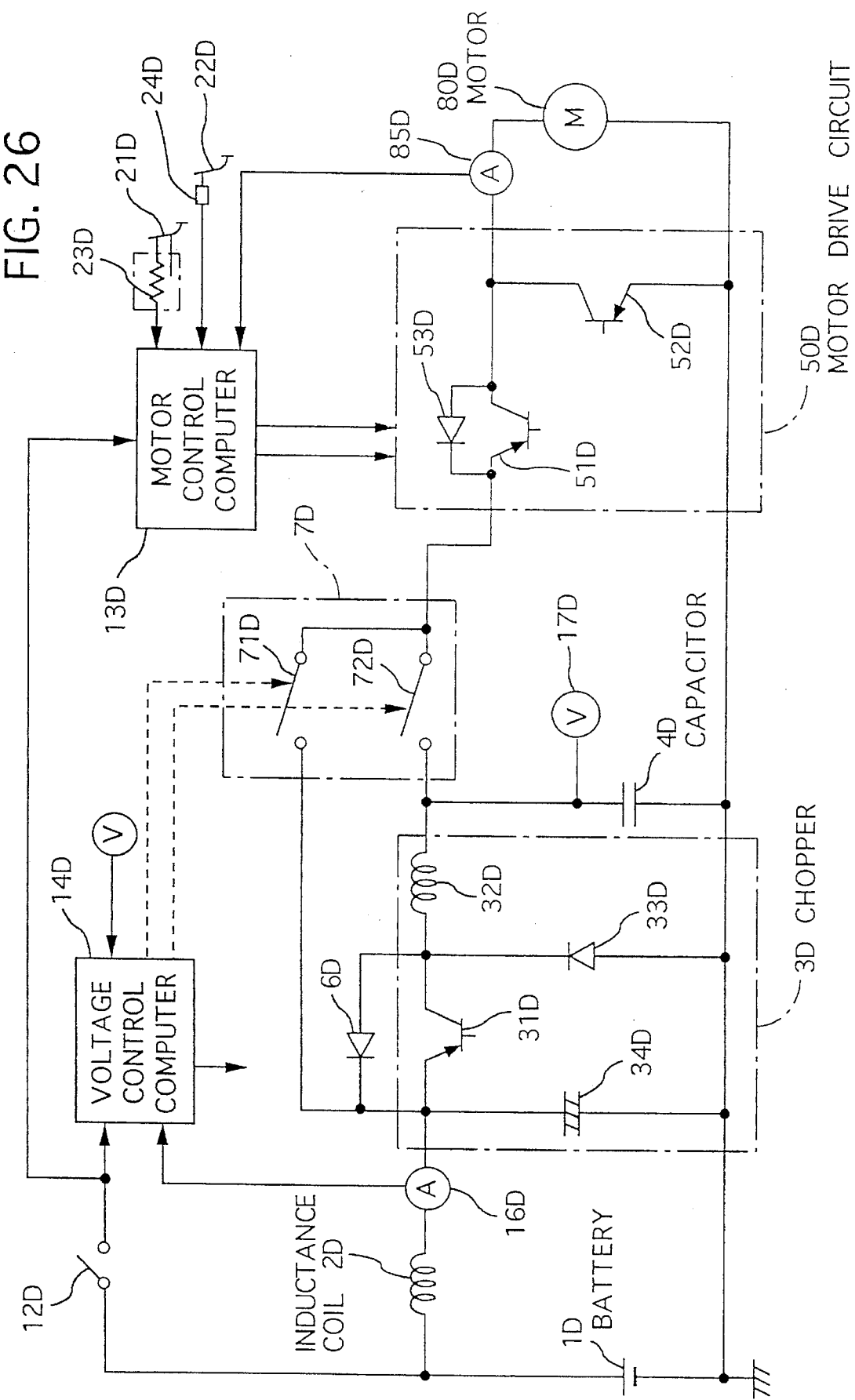
FIG. 26 is a circuit diagram of a twelfth embodiment of an apparatus in accordance with the present invention.

FIG. 26 illustrates a twelfth embodiment of the present invention. As shown, a motor drive circuit 50D acting as the motor control means includes transistors 51D and 52D which control the power to be supplied to a motor 80D from the battery 1D via the chopper 3D, or from the capacitor 4D. The motor drive circuit 50D is constituted such that the transistors 51D and 52D are turned on and off in accordance with the pulse signals from a motor control computer 13D to vary the driving force of the motor 80D. In addition, a current sensor 85D is connected to the motor control computer 13D. The remainder of the constitution of the apparatus of the twelfth embodiment is identical to that of the eleventh embodiment. So, in FIG. 26, parts similar to those in FIG. 25 are given the same number as in FIG. 25, and repetition of the previous description will be omitted.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A power supply apparatus for a motor drive apparatus of an electric vehicle, wherein said motor drive apparatus drives a motor of said electric vehicle, said power supply apparatus comprising:

a first battery;

a first coil of which one end is connected to a plus terminal of said first battery;

a first capacitor of high responsivity, which is connected between the other end of said first coil and a minus terminal of said first battery;

a second coil of which one end is connected to the other end of said first coil;

a second capacitor of high responsivity, which is connected between the other end of said second coil and said minus terminal of said first battery;

a third coil of which one end is connected to said the other end of said second coil; and a second battery connected between the other end of said third coil and said minus terminal of said first battery, wherein an electric load of said motor drive apparatus is connected across both ends of said first capacitor which supplies power to said electric load.

2. A power supply apparatus for an electric vehicle comprising:

a battery;

a coil;

a switching element connected between a plus terminal of said battery and one end of said coil, which periodically opens and closes to control a voltage between the other end of said coil and a minus terminal of said battery;

a first diode of which an anode end is connected between said switching element and said coil, and a cathode end is connected to the minus terminal of said battery;

a capacitor having a large capacitance, which is connected between said other end of said coil and the minus terminal of said battery; and motor control means connected to both ends of said capacitor to control a motor of the electric vehicle based on an accelerator operation or braking operation of the electric vehicle, wherein an electric load of said motor control means is connected across both ends of said capacitor which supplies power to said electric band.

3. A power supply apparatus as claimed in claim 2, wherein said motor control means includes a second diode disposed between said motor and said capacitor so as to feed an electric current from said motor to said capacitor, and a third diode disposed between said capacitor and said battery so as to feed an electric current from said capacitor to said battery.

4. A power supply apparatus as claimed in claim 3, further comprising:

change-over means connected to one end of said motor control means, a connecting point between said plus terminal of said battery and said switching element and a connecting point between said capacitor and said coil, for changing over the connection of one end of said motor control means to one of connecting points between said plus terminal of said battery and said switching element and between said capacitor and said coil.

5. A power supply apparatus as claimed in claim 4, further comprising change-over control means connected to said change-over means for selecting said connection of said one end of said motor control means in accordance with the running state of the electric vehicle and for automatically changing over to the selected connection.

6. A power supply apparatus for an electric vehicle comprising:

a battery;

a capacitor having a large capacitance;

motor control means connected to both ends of said capacitor for controlling a motor of the electric vehicle based on one of an accelerator operation signal and a brake operation signal;

current limit means of which one end is connected between said motor control means and said capacitor for limiting an electric current to be fed to said capacitor, thereby limiting a voltage of said capacitor;

change-over means connected to said motor control means, a plus terminal of said battery and the other end of said current limit means for changing over a connection of said motor control means to one of said plus terminal of said battery and a connection of said motor control means to the other end of said current limit means; and change-over control means connected to said change-over means for controlling said change-over means, said change-over control means selecting one of the connection of said plus terminal of said battery to said other end of said current limit means and connection of said plus terminal of said battery to said one end of said motor control means.

7. A power supply apparatus as claimed in claim 6, wherein said current limit means includes an armature coil of said motor, and said motor control means includes a switching element connected to said armature coil by means of one of a chopper and an invertor, said change-over means changing over a connection between said plus terminal of said battery and said motor control means and a connection of said plus terminal of said battery to said capacitor via said armature coil, and said switching element controlling said voltage of said capacitor when said change-over means changes over a connection of said plus terminal of said battery to said capacitor via said armature coil.

8. A power supply apparatus comprising:

a battery;

motor control means adapted to control power from said battery and to supply controlled power to a motor of the electric vehicle;

a chopper composed of a switching element connected to said battery for turning an output current from said battery on and off, a coil connected to an output of said switching element for smoothing an intermittent current from said switching element, and a free wheel diode connected to said switching element in parallel;

a capacitor having a large capacitance, which is connected to an output end of said chopper in parallel; and change-over means connected to said battery, an output of said chopper and said motor control means, including a first change-over position which connects said motor control means to said output of said chopper such that said chopper is disposed between said battery and said motor control means and said capacitor is directly connected to said motor control means, a second change-over position which connects said motor control means to each of said output of said chopper and said battery such that both of said motor control means and said capacitor are directly connected to said battery, and a third change-over position which connects said motor control means to said battery such that said motor control means are directly connected to said battery and said capacitor is connected to said battery via said chopper, said change-over means connecting said motor control means to one or more of said output of said chopper and said battery in accordance with one of said three change-over positions.

9. A power supply apparatus as claimed in claim 8, further comprising:

change-over control means connected to said change-over means for automatically controlling said change-over means to change over to one of said first, second and third change-over positions in accordance with the running state of the electric vehicle.

10. A power supply apparatus as claimed in claim 8, further comprising:

a diode of which an anode end is connected to a connection point of said switching element and said coil and a cathode end is connected to a connection point of said battery and said switching element for supplying a charge current to said battery.

11. A power supply apparatus as claimed in claim 8, further comprising:

a coil which smooths the output current from said battery, which is interposed between said input end of said chopper and said battery.

12. A power supply apparatus for an electric vehicle comprising:

a battery;

motor control means for controlling power from said battery and supplying controlled power to a motor of the electric vehicle;

a chopper disposed between said battery and said motor control means comprising a switching element connected to said battery for turning an output current from said battery on and off, a coil connected to an output of said switching element for smoothing an intermittent current from said switching element, and a free wheel diode to be connected to said switching element in parallel;

a capacitor having a large capacitance, which is connected to an output side of said chopper in parallel;

first switch means disposed between said motor control means and a connection point of an input end of said chopper and said battery, for opening or closing between said motor control means and said connection point an input end of said chopper and said battery; and second switch means, disposed between said motor control means and a connection point of an output end of said chopper and said capacitor, for opening or closing between said motor control means and said connection point of an output end of said chopper and said capacitor.

13. A power supply apparatus as claimed in claim 12, further comprising:

a diode of which an anode end is connected to a connection point of said switching element and said coil and a cathode end is connected to a connection point of said battery and said switching element for supplying a charge current to said battery.

14. A power supply apparatus as claimed in claim 12, further comprising:

a coil which smooths the output current from said battery, which is interposed between said input end of said chopper and said battery.

* * * * *